(12) United States Patent
Kaminaga et al.

(10) Patent No.: US 11,780,978 B2
(45) Date of Patent: Oct. 10, 2023

(54) GAS BARRIER FILM

(71) Applicant: TOPPAN PRINTING CO., LTD., Tokyo (JP)

(72) Inventors: Junichi Kaminaga, Tokyo (JP); Sayaka Hoshi, Tokyo (JP); Yuki Omura, Tokyo (JP); Seiya Suzuki, Tokyo (JP); Yoshiki Koshiyama, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 223 days.

(21) Appl. No.: 17/339,078

(22) Filed: Jun. 4, 2021

(65) Prior Publication Data
US 2021/0292503 A1 Sep. 23, 2021

Related U.S. Application Data

(63) Continuation of application No. PCT/JP2019/047432, filed on Dec. 4, 2019.

(30) Foreign Application Priority Data

Dec. 6, 2018 (JP) .................................. 2018-229369
Mar. 29, 2019 (JP) .................................. 2019-069011

(51) Int. Cl.
*C09D 7/61* (2018.01)
*C08J 7/048* (2020.01)
(Continued)

(52) U.S. Cl.
CPC .............. *C08J 7/048* (2020.01); *B65D 65/42* (2013.01); *C08J 5/18* (2013.01); *C08J 7/0427* (2020.01);
(Continued)

(58) Field of Classification Search
CPC ...... B32B 3/30; C09D 129/04; C09D 129/06; C09D 129/08
See application file for complete search history.

(56) References Cited

U.S. PATENT DOCUMENTS 6,291,053 B1 * 9/2001 Peiffer .................... B32B 27/36
264/172.19
2016/0040035 A1 2/2016 Omura et al.

FOREIGN PATENT DOCUMENTS

EP 2 990 451 A1 3/2016
EP 3 064 351 A1 9/2016
(Continued)

OTHER PUBLICATIONS

Machine translation of JP 2014-218090 (Year: 2014).*
(Continued)

*Primary Examiner* — Zachary M Davis
(74) *Attorney, Agent, or Firm* — Foley & Lardner LLP

(57) ABSTRACT

A gas barrier film including a substrate film containing a resin, and a gas barrier layer that has oxygen barrier properties and is in contact with at least one surface of the substrate film, a surface of the gas barrier layer has a flat portion, and a plurality of protrusions that protrude from the flat portion. The number of protrusions that satisfy the following formula (1) is 0 to 200 per mm², and the number of protrusions that satisfy the following formula (2) is 20 or more per mm²; d×2≤f(1); and 0.2≤f<d×2(2), where d represents a thickness (μm) of the gas barrier layer, and f represents a height (μm) of each of the plurality of protrusions.

16 Claims, 5 Drawing Sheets

(51) Int. Cl.
  *C08J 7/04*    (2020.01)
  *B65D 65/42*   (2006.01)
  *C08J 5/18*    (2006.01)
  *C09D 175/12*  (2006.01)

(52) U.S. Cl.
  CPC ............. *C09D 7/61* (2018.01); *C09D 175/12* (2013.01); *C08J 2323/12* (2013.01); *C08J 2367/02* (2013.01); *C08J 2377/00* (2013.01); *C08J 2429/04* (2013.01); *C08J 2475/04* (2013.01); *C08J 2475/12* (2013.01)

(56) References Cited

FOREIGN PATENT DOCUMENTS

| EP | 3 135 478 A1 | 3/2017 |
| JP | H09-150484 A | 6/1997 |
| JP | H09-324061 A | 12/1997 |
| JP | 2001-048994 A | 2/2001 |
| JP | 2001-071425 A | 3/2001 |
| JP | 2001-316489 A | 11/2001 |
| JP | 2014218090 A * | 11/2014 |
| JP | 2017-071693 A | 4/2017 |
| JP | 6191221 B2 | 9/2017 |

OTHER PUBLICATIONS

International Searching Authority, "International Search Report," issued in connection with International Patent Application No. PCT/JP2019/047432, dated Feb. 18, 2020.

International Searching Authority, "Written Opinion," issued in connection with International Patent Application No. PCT/JP2019/047432, dated Feb. 18, 2020.

European Extended Search Report, dated Jan. 28, 2022, issued in corresponding European Patent Application No. 19893582.7, (9 pages).

* cited by examiner

GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/047432, filed on Dec. 4, 2019, which is based upon and claims the benefit of priority to Japanese Patent Application No. 2018-229369, filed on Dec. 6, 2018 and Japanese Patent Application No. 2019-069011, filed on Mar. 29, 2019, the disclosures of which are incorporated herein by reference in their entireties.

BACKGROUND

Technical Field

Background Art

Packaging materials used for packaging food products, pharmaceutical products, or the like are required to have properties for preventing the entry of gas (water vapor, oxygen, or the like) that deteriorates the contents, that is, to have gas barrier properties, in order to prevent deterioration and decay of the contents and retain the functions and quality of the contents.

Packaging materials conventionally used include a film material having gas barrier properties (gas barrier film). Known gas barrier films include a gas barrier film in which a gas barrier layer made of a material having gas barrier properties is provided on a surface of a resin substrate. Known gas barrier layers include metal foils, inorganic vapor deposition films, films formed by wet coating methods, and the like. Known films formed by a wet coating method include, as films having oxygen barrier properties, resin films made of coating agents containing water-soluble polymers and resins such as polyvinylidene chloride, and inorganic layered mineral composite resin films made of coating agents containing water-soluble polymers and inorganic layered minerals (Patent Literature 1).

It has been reported that gas barrier properties are improved by enhancing surface smoothness of a substrate that constitutes an inorganic vapor deposition film or an inorganic layered mineral composite resin film or by reducing the number of protrusions on the substrate surface (Patent Literatures 2 and 3).

It has also been reported that gas barrier properties are improved by enhancing surface smoothness of an inorganic layered mineral composite resin film (Patent Literatures 4 and 5).

[Citation List] [Patent Literature] [PTL 1] JP 6191221 B; [PTL 2] JP 2001-316489 A; [PTL 3] JP 2001-48994 A; [PTL 4] JP H09-324061 A; [PTL 5] JP H09-150484 A.

SUMMARY OF THE INVENTION

Technical Problem

However, in the case where surface smoothness of a substrate is enhanced or the number of protrusions on the substrate surface is reduced, when a gas barrier film is taken up in a roll, in some cases, front and back surfaces of the film are adhered to each other and blocking occurs, resulting in defects such as scratching, tearing, or breaking in post-processing steps such as coating, rewinding, slitting, printing, and lamination. This makes it difficult to perform post-processing such as slitting.

In order to prevent blocking, inorganic particles or organic particles are typically added as an anti-blocking agent to a surface layer of the substrate to provide protrusions on the substrate surface. However, when a film is formed on such a substrate surface by a wet coating method, if the film has a small thickness, pinhole defects occur at the protrusion portions of the film, and gas barrier properties are not stably exhibited. Thus, a film having an excessive thickness is required to be formed, resulting in problems such as a higher drying load of a coating agent and higher material cost for the coating agent.

An object of the present invention is to provide a gas barrier film that has high gas barrier properties and in which the occurrence of blocking is prevented.

Another object of the present invention is to provide a gas barrier film that has high gas barrier properties and high blocking resistance and minimizes a drying load and material cost during film formation by a wet coating method.

Solution to Problem

The present invention relates to a gas barrier film including a substrate film containing a resin, and a gas barrier layer that has oxygen barrier properties and is located in contact with at least one surface of the substrate film.

A surface of the gas barrier layer has a flat portion, and a plurality of protrusions that protrude from the flat portion. When the thickness ($\mu$m) of the gas barrier layer is d and the height ($\mu$m) of each of the plurality of protrusions is f, the number of protrusions satisfying the following formula (1) is 0 to 200 per mm$^2$ and the number of protrusions satisfying the following formula (2) is 20 per mm$^2$ or more.

$$d \times 2 \leq f \tag{1}$$

$$0.2 \leq f < d \times 2 \tag{2}$$

Another gas barrier film of the present invention includes a substrate film containing a resin, and a gas barrier layer which is an oxygen barrier film formed by a wet coating method. The gas barrier is located in contact with at least one surface of the substrate film.

The surface of the substrate film that is in contact with the gas barrier layer has a flat portion and a plurality of protrusions that protrude from the flat portion.

When in a randomly selected region of 0.66 mm$^2$ or more on the surface of the substrate film in contact with the gas barrier layer, a height of each of the plurality of protrusions is measured by using a 3D measurement laser microscope, a thickness t($\mu$m) of the gas barrier layer satisfies the following formula (3): $0.25 \times h + 0.15 \leq t \leq 0.8 \times h(3)$, where h represents an average height ($\mu$m) of protrusions having a height of 0.3 $\mu$m or more.

Advantageous Effects of the Invention

The gas barrier film of the present invention is a gas barrier film that has high gas barrier properties and in which the occurrence of blocking is prevented.

The other gas barrier film according to the present invention has high gas barrier properties and high blocking resistance. Furthermore, the film formed by a wet coating method does not have an excessive thickness; thus, a drying load and material cost during film formation are minimized.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

With reference to the accompanying drawings, some embodiments of the present invention will be described.

In order to solve the problems described above, the inventors have cut a portion on a substrate surface of a gas barrier film at which an anti-blocking agent is present by using a focused ion/electron beam processing apparatus to expose a cross section, and have observed the cross section by using an electron microscope. Then, the inventors have discovered a relationship between a protruding state of the anti-blocking agent from the substrate surface, the thickness of an oxygen barrier film, and the presence or absence of a missing portion of the oxygen barrier film on the anti-blocking agent and the size of the missing portion. Thus, the inventors have reached the present invention.

Figure 1:
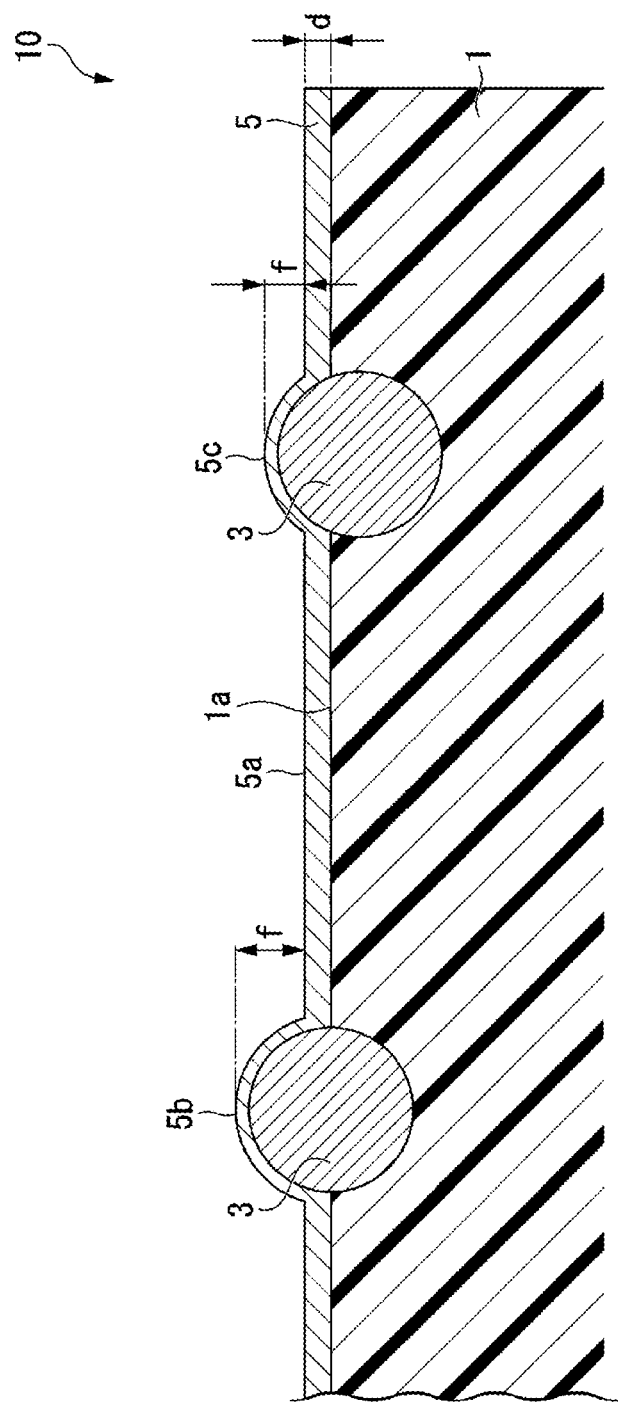
FIG. 1 is a schematic cross-sectional view of a gas barrier film according to a first embodiment of the present invention.

FIG. 1 is a schematic cross-sectional view of a gas barrier film 10 according to a first embodiment of the present invention.

The gas barrier film 10 includes a substrate film 1 and a gas barrier layer 5.

The gas barrier layer 5 is located in contact with at least a first surface 1a (one surface) of the substrate film 1.

The gas barrier layer 5 may be provided only on the first surface 1a of the substrate film 1, or may be provided on both the first surface 1a and a second surface (not shown) of the substrate film 1 opposite to the first surface 1a.

(Substrate Film)

The substrate film 1 contains a resin.

Examples of the resin include polyolefin resins, polyester resins, polyamide resins, vinyl resins, acrylic resins, and cellophane. Examples of the polyolefin resins include homopolymers and copolymers of olefins having 2 to 10 carbon atoms, and specific examples include polyethylene, polypropylene, and a propylene-ethylene copolymer. Examples of the polyester resins include polyethylene terephthalate and polybutylene terephthalate. Examples of the polyamide resins include aliphatic polyamides such as nylon 6 and nylon 66, and aromatic polyamides such as polymetaxylylene adipamide. Examples of the vinyl resins include polystyrene, polyvinyl acetate, an ethylene-vinyl acetate copolymer, polyvinyl alcohol, and an ethylene-vinyl alcohol copolymer. Examples of the acrylic resins include homopolymers and copolymers of (meth)acrylic monomers such as (meth)acrylate and (meth)acrylonitrile, and specific examples include polymethyl methacrylate and polyacrylonitrile. (Meth)acryl is a general term for acryl and methacryl, and the same applies to (meth)acrylate and (meth)acrylonitrile.

These resins may be used singly or in combination of two or more.

The substrate film 1 contains an anti-blocking agent 3. The anti-blocking agent 3 is dispersed in the substrate film 1.

On each of the first surface 1a and the second surface of the substrate film 1, a plurality of protrusions derived from the anti-blocking agent 3 are locally present. The anti-blocking agent 3 may be exposed or covered with a resin on the first surface 1a and the second surface.

The anti-blocking agent 3 causes protrusions on a surface of the gas barrier film 10 (a surface of the gas barrier layer 5 or the surface of the substrate film 1) to prevent the occurrence of blocking of the gas barrier film 10, leading to higher processability of the gas barrier film 10.

The anti-blocking agent 3 is in the form of solid particles, and may be organic particles, inorganic particles, or the like. Examples of the organic particles include acrylic resin particles such as particles of polymethyl methacrylate, polystyrene particles, and polyamide particles. These organic particles may be obtained, for example, by emulsion polymerization, suspension polymerization, or the like. Examples of the inorganic particles include particles of silica, zeolite, talc, diatomaceous earth, kaolinite, and feldspar. These anti-blocking agents may be used singly or in combination of two or more.

The anti-blocking agent 3 has an average particle size of, for example, 0.4 to 10 μm. The term average particle size herein refers to a median diameter measured by a Coulter counter method.

The substrate film 1 may further contain additives other than the anti-blocking agent 3. Examples of such additives include fillers, surfactants, and antistatic agents such as metal oxides.

The substrate film 1 may be a single-layer film made of a single resin, a single-layer or laminated film made of a plurality of resins, or a laminated film in which a resin layer and another substrate (metal, wood, paper, ceramic, or the like) are laminated.

An example of the laminated film made of a plurality of resins is a film in which a first surface layer containing a resin and an anti-blocking agent, a base layer containing a resin but not containing an anti-blocking agent, and a second surface layer containing a resin and an anti-blocking agent are laminated in this order from the first surface 1a side.

From the viewpoint of ease of availability and water vapor barrier properties, the substrate film 1 is preferably a polyolefin resin film (in particular, a polypropylene film or the like), a polyester resin film (in particular, a polyethylene terephthalate resin film), or a polyamide resin film (in particular, a nylon film).

The substrate film 1 may be an unstretched film, or may be a uniaxially or biaxially stretched oriented film.

The substrate film 1 may be a film subjected to surface treatment (corona discharge treatment, low-temperature plasma treatment, or the like), or anchor coat or undercoat treatment. For example, by performing corona treatment or low-temperature plasma treatment on the surface of the substrate film 1 on which the gas barrier layer 5 is to be formed, it is possible to improve wettability to a coating agent and adhesion strength to the gas barrier layer 5.

The thickness of the substrate film 1 is not specifically limited, and is appropriately selected according to the price and application, taking into consideration suitability as a packaging material and suitability for lamination of other films. The thickness of the substrate film 1 is practically in a range of 3 μm to 200 μm, preferably 5 μm to 120 μm, and more preferably 10 μm to 100 μm.

(Gas Barrier Layer)

The gas barrier layer 5 may be a gas barrier layer known as an oxygen barrier film formed by a wet coating method.

The gas barrier layer 5 is obtained by forming a coating film made of a coating agent on the first surface 1a of the substrate film 1 by a wet coating method, and drying the coating film. Herein, the term coating film refers to a wet film, and the term film refers to a dry film.

The gas barrier layer 5 is preferably a film (inorganic layered mineral composite resin film) formed of a coating agent containing a water-soluble polymer and an inorganic layered mineral. A gas barrier film including an inorganic layered mineral composite resin film as a gas barrier layer has advantages such as high oxygen barrier properties even in a high humidity atmosphere, adhesion strength to other materials and film cohesive strength sufficient as a packaging material, transparency and stretch resistance that a metal foil or a metal vapor deposition film does not have, and no risk of generating harmful substances such as dioxins. The coating agent will be described later in detail.

The surface of the gas barrier layer 5 has a flat portion 5a and a plurality of protrusions 5b and 5c that protrude from the flat portion 5a.

The plurality of protrusions 5b and 5c are derived from the anti-blocking agent 3 contained in the substrate film 1. Specifically, as described above, the plurality of protrusions derived from the anti-blocking agent 3 are present on the first surface 1a of the substrate film 1. Thus, when a coating agent is applied to the first surface 1a, a coating film of the coating agent is formed on the first surface 1a to form the gas barrier layer 5 having the plurality of protrusions 5b and 5c at positions corresponding to the plurality of protrusions on the first surface 1a.

As shown in FIG. 1, when d represents the thickness (μm) of the gas barrier layer 5, and f represents the height (μm) of each of the plurality of protrusions 5b and 5c, the protrusions 5b satisfy the following formula (1), and the protrusions 5c satisfy the following formula (2).

$$d \times 2 \leq f \tag{1}$$

$$0.2 \leq f < d \times 2 \tag{2}$$

On the surface of the gas barrier layer 5, the number of protrusions 5b that satisfy the formula (1) is 0 to 200 per mm$^2$, and preferably 0 to 100 per mm$^2$. When the number of protrusions 5b is 0 per mm$^2$, the protrusion 5b is not present.

The protrusion 5b shown in FIG. 1 has a height f of d×2 μm or more; thus, the gas barrier layer 5 has a small thickness at the position of the protrusion 5b, and oxygen barrier properties of the gas barrier layer 5 may be impaired. When the number of protrusions 5b is 200 or less per mm$^2$, the gas barrier layer 5 has high oxygen barrier properties.

On the surface of the gas barrier layer 5, the number of protrusions 5c that satisfy the formula (2) is 20 or more per mm$^2$, and preferably 30 or more per mm$^2$.

The protrusion 5c has a height f of 0.2 μm or more; thus, the protrusion 5c prevents blocking of the gas barrier film 10 on the surface of the gas barrier layer 5. Furthermore, the height f of the protrusion 5c is less than (d×2) μm; thus, oxygen barrier properties of the gas barrier layer 5 are less likely to be impaired. When the number of protrusions 5c is 20 or more per mm$^2$, blocking of the gas barrier film 10 can be prevented, leading to good processability of the gas barrier film 10.

The upper limit of the number of protrusions 5c is not specifically limited, and is, for example, 200 per mm$^2$.

The number of protrusions 5b and 5c can be adjusted by changing the average particle size and the content of the anti-blocking agent 3 in the substrate film 1, a thickness d of the gas barrier layer 5, or the like.

The thickness d of the gas barrier layer 5 herein refers to the thickness of the gas barrier layer 5 at the flat portion 5a. The thickness d is measured by observing a cross section in the thickness direction of the gas barrier film 10 by using a scanning electron microscope (SEM).

The heights f of the protrusions 5b and 5c are the heights at the apexes of the protrusions 5b and 5c with respect to the flat portion 5a in the thickness direction of the gas barrier film 10.

The number of protrusions 5b and 5c on the surface of the gas barrier layer 5 is measured by the following measurement method.

<Method of Measuring the Number of Protrusions>

In a randomly selected region on the surface of the gas barrier layer 5, the height at the apex of protruding portions from the flat portion 5a is measured under the following conditions by using a 3D measurement laser microscope (LEXT OLS4000, manufactured by Olympus Corporation). Protruding portions whose height is the height of the flat portion 5a+0.2 μm or more are determined as the protrusions 5b and 5c. Then, the number of protrusions 5b having a height of twice or more the thickness d of the gas barrier layer 5 and the number of protrusions 5c having a height less than twice the thickness d of the gas barrier layer 5 are counted, and each of the counted numbers is converted into a value per unit area.

Lens: Objective lens, magnification 50 times (MPLAPONLEXT50)

Measurement area: 514 μm×1285 μm

Filter: Surface correction

Figure 2:
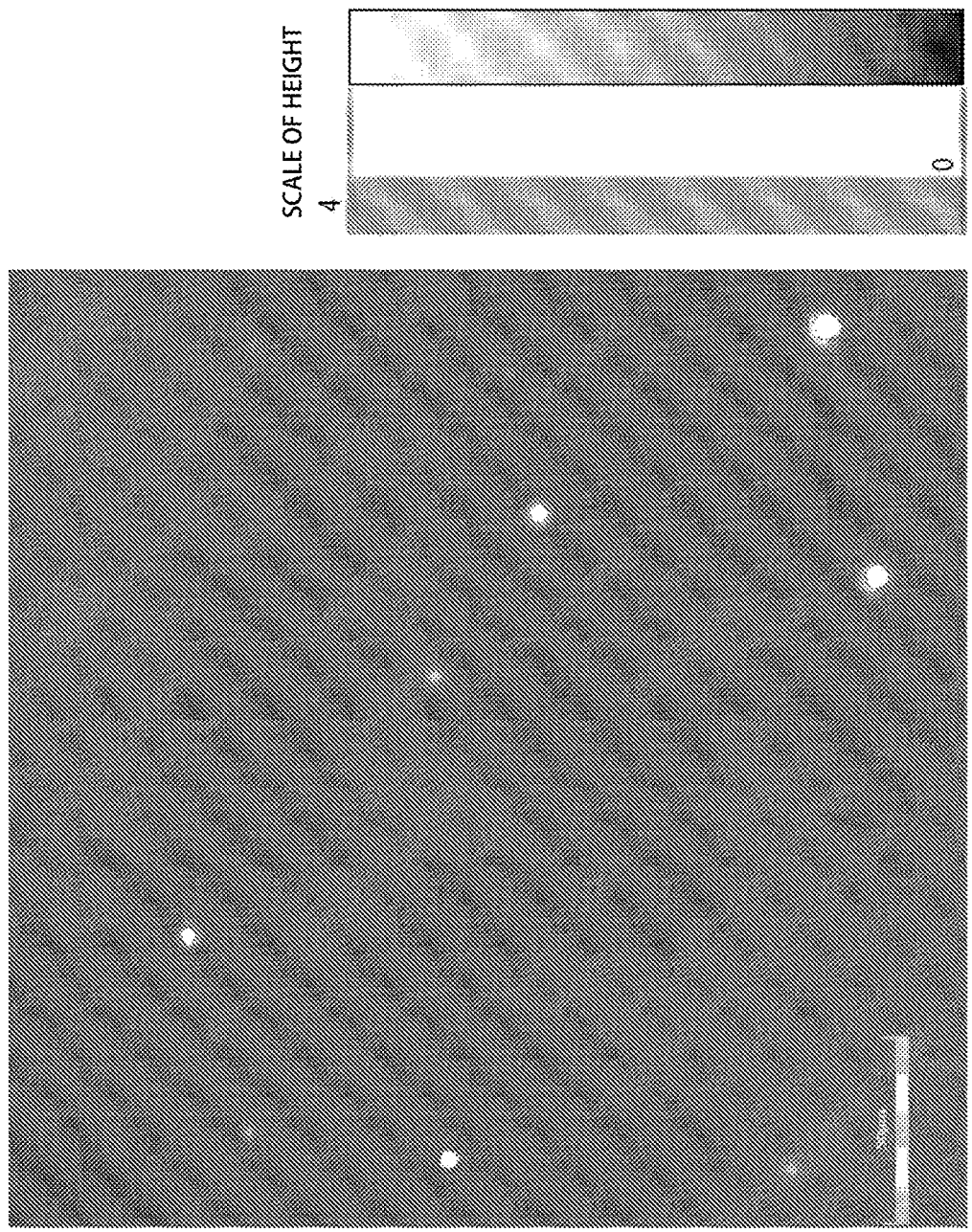
FIG. 2 is a contour map of the height of protruding portions on a surface of a gas barrier layer of a gas barrier film of an example, obtained by measurement by using a 3D measurement laser microscope.

Mode: Measurement in profile mode of height at apex of protruding portions from flat portion The measurement of the number of protrusions described above provides a contour map of the surface of the gas barrier layer 5 as shown in FIG. 2. In FIG. 2, a higher brightness indicates greater height.

The diameter of a cross section of the protrusion 5c at a height of 0.2 μm (at a position at the height of the flat portion 5a+0.2 μm) is preferably 0.4 to 10 μm, and more preferably 1 to 6 μm. When the diameter is the lower limit or more, removal of the protrusion is prevented, and when the diameter is the upper limit or less, distortion in appearance or printing failure of the gas barrier film is less likely to occur.

When the protrusion 5b is present, the diameter of a cross section of the protrusion 5b at a height of 0.2 μm (at a position at the height of the flat portion 5a+0.2 μm) is preferably 0.4 to 10 μm, and more preferably 1 to 6 μm. When the diameter is the lower limit or more, removal of the protrusion is prevented, and when the diameter is the upper limit or less, distortion in appearance or printing failure of the gas barrier film is less likely to occur.

The diameters of the cross sections of the protrusions 5b and 5c are measured by using the 3D measurement laser microscope described above. Specifically, the measurement is performed as described later in Examples.

When the cross sections of the protrusions 5b and 5c have an irregular shape, the diameters of the cross sections of the protrusions 5b and 5c are equivalent circle diameters (Heywood diameters) calculated from the areas of the cross sections of the protrusions 5b and 5c measured by using the 3D measurement laser microscope.

The thickness d of the gas barrier layer 5 is set according to the number of protrusions 5b and 5c on the surface of the gas barrier layer 5 and the required oxygen barrier properties. The thickness d of the gas barrier layer 5 is preferably in a range of 0.2 to 5 μm, more preferably 0.2 to 2 μm, and still more preferably 0.3 to 1 μm. When the thickness d of the gas barrier layer 5 is the lower limit or more, sufficient oxygen barrier properties are easily obtained. Furthermore, a uniform coating film is easily formed; thus, oxygen barrier properties can be prevented from being influenced by the protrusions on the surface of the substrate film 1. When the thickness d of the gas barrier layer 5 is the upper limit or less, a lower drying load and lower manufacturing cost can be achieved.

(Method of Manufacturing Gas Barrier Film)

The gas barrier film 10 can be manufactured by forming the gas barrier layer 5 on at least the first surface 1a (only the first surface 1a or both the first surface 1a and the second surface) of the substrate film 1.

The substrate film 1 may be a substrate film that is commercially available, or may be a substrate film that is manufactured by a known method.

As described above, the gas barrier layer 5 is obtained by forming a coating film made of a coating agent on at least the first surface 1a of the substrate film 1 by a wet coating method, and drying the coating film.

The wet coating method may be a known wet coating method such as a roll coating method, a gravure coating method, a reverse coating method, a die coating method, a screen printing method, or a spray coating method.

The coating film made of the coating agent may be dried by a known drying method such as hot-air drying, heat roll drying, or infrared irradiation. The drying temperature for the coating film is preferably in a range of 50 to 200° C., for example. The drying time varies depending on the thickness of the coating film, the drying temperature, and the like, but is preferably in a range of 1 second to 5 minutes, for example.

(Coating Agent)

As described above, a preferable embodiment of the coating agent is a coating agent containing a water-soluble polymer and an inorganic layered mineral.

The coating agent of the present embodiment typically further contains an aqueous medium.

The coating agent of the present embodiment preferably further contains an aqueous polyurethane resin.

The coating agent of the present embodiment may further contain other components as necessary to such an extent that gas barrier properties and strength as a packaging material are not impaired.

<Water-Soluble Polymer>

The water-soluble polymer refers to a polymer that can be dissolved in water. The dissolved state refers to a state in which a polymer as a solute is dispersed at molecular chain level in water as a solvent to form a homogeneous system. More specifically, the dissolved state refers to a state in which the intermolecular force between polymer chains and water molecules is stronger than that between the polymer chains such that the polymer chains are disentangled and uniformly dispersed in water.

The water-soluble polymer is not specifically limited as long as the water-soluble polymer is a compound that can be inserted and coordinated (intercalated) between unit crystals of the inorganic layered mineral.

Specific examples of the water-soluble polymer include polyvinyl alcohol resins (polyvinyl alcohol and derivatives thereof, and the like), other vinyl polymers (polyvinylpyrrolidone, polyacrylic acid, polymethacrylic acid, and esters and salts thereof, and copolymers thereof, polyhydroxyethyl methacrylate and copolymers thereof, and the like), cellulose derivatives (carboxymethyl cellulose, hydroxyethyl cellulose, and the like), starches (oxidized starch, etherified starch, dextrin, and the like), copolyesters having a polar group (polyesters having a sulfoisophthalic acid structure, and the like), and urethane polymers (except for an aqueous polyurethane resin (described later)), and functional group-modified polymers with a modified carboxyl group or the like of these various polymers.

In consideration of the film cohesive strength, the water-soluble polymer preferably has a polymerization degree of 200 or more.

The coating agent of the present embodiment may contain one or more types of water-soluble polymers.

The water-soluble polymer preferably contains at least one polyvinyl alcohol resin selected from the group consisting of at least a polyvinyl alcohol polymer and derivatives thereof, and more preferably contains a polyvinyl alcohol resin having a saponification degree of 95% or more and a polymerization degree of 300 or more. The polymerization degree of the polyvinyl alcohol resin is preferably in a range of 300 to 2400, and more preferably 450 to 2000. The polyvinyl alcohol resin having a higher saponification degree and a higher polymerization degree has lower hygroscopic and swelling properties. When the saponification degree of the polyvinyl alcohol resin is 95% or more, sufficient gas barrier properties are easily obtained. When the polymerization degree of the polyvinyl alcohol resin is 2400 or less, the coating agent has a sufficiently low viscosity, and this makes it easy to uniformly mix the coating agent with other components; thus, a problem such as lower gas barrier properties or lower adhesion strength is less likely to occur.

<Inorganic Layered Mineral>

The inorganic layered mineral refers to an inorganic compound in which extremely thin (for example, 10 to 500 nm thickness) unit crystal layers are layered to form a single layered particle. The inorganic layered mineral is used to further enhance gas barrier properties of the gas barrier layer.

The inorganic layered mineral is preferably a compound having one or both of swelling properties and cleavage properties in water, and particularly preferably a clay compound having water swelling properties. More specifically, the inorganic layered mineral is preferably a clay compound in which water is coordinated between extremely thin unit crystal layers and that has one or both of absorption properties and swelling properties. Such a clay compound is generally a compound having a layered structure in which layers having a tetrahedral structure with $Si^{4+}$ coordinated to $O^{2-}$ and layers having an octahedral structure with $Al^{3+}$, $Mg^{2+}$, $Fe^{2+}$, $Fe^{3+}$ and the like coordinated to $O^{2-}$ and $OH^-$ are bonded at a ratio of 1:1 or 2:1, and stacked. The clay compound may be a natural compound or a synthetic compound.

Typical examples of the inorganic layered mineral include hydrous silicates such as phyllosilicate minerals, and include, for example, kaolinite clay minerals such as halloysite, kaolinite, endellite, dickite, and nacrite; antigorite clay minerals such as antigorite and chrysotile; smectite clay minerals such as montmorillonite, beidellite, nontronite, saponite, hectorite, sauconite, and stevensite; vermiculite clay minerals such as vermiculite; micas and mica clay minerals such as white mica, bronze mica, margarite, tetrasilicic mica, and taeniolite. These inorganic layered minerals may be used singly or in combination of two or more.

In particular, the inorganic layered mineral is preferably a smectite clay mineral such as montmorillonite, or a mica clay mineral such as water-swellable mica.

The inorganic layered mineral preferably has an average particle size of 10 µm or less and a thickness of 500 nm or less. When the average particle size and the thickness are the respective upper limits or less, the particles of the inorganic layered mineral are easily uniformly arranged in the gas barrier layer made of the coating agent, leading to higher gas barrier properties and higher film cohesive strength.

The lower limit of the average particle size of the inorganic layered mineral is, for example, 1 µm.

The lower limit of the thickness of the inorganic layered mineral is, for example, 1 nm.

The average particle size of the inorganic layered mineral is measured by a laser diffraction and dispersion method.

The thickness of the inorganic layered mineral is measured by an X-ray diffraction method.

<Aqueous Medium>

The aqueous medium may be water, a water-soluble or hydrophilic organic solvent, or a mixed solvent thereof. The aqueous medium is preferably water or a mixed solvent containing water as a main component.

The content of water in the aqueous medium is preferably 50 mass % or more, and more preferably 60 mass % or more.

Examples of the water-soluble or hydrophilic organic solvent include alcohols such as ethanol and isopropanol; ketones such as acetone and methyl ethyl ketone; ethers such as tetrahydrofuran; cellosolves; carbitols; and nitriles such as acetonitrile.

<Aqueous Polyurethane Resin>

The aqueous polyurethane resin contains a polyurethane resin having an acid group (hereinafter also referred to as an "acid group-containing polyurethane resin"), and a polyamine compound. The aqueous polyurethane resin is used to impart flexibility and gas barrier properties, in particular, oxygen barrier properties, to the gas barrier layer.

The aqueous polyurethane resin allows gas barrier properties to be exhibited due to a bond between the acid group of the acid group-containing polyurethane resin and the polyamine compound as a crosslinking agent. The bond between the acid group of the acid group-containing polyurethane resin and the polyamine compound may be an ionic bond (for example, an ionic bond between a carboxyl group and a tertiary amino group, or the like), or may be a covalent bond (for example, an amide bond or the like).

Since the acid group-containing polyurethane resin constituting the aqueous polyurethane resin has an acid group, the acid group-containing polyurethane resin is anionic and self-emulsifying, and is thus also referred to as an anionic self-emulsifying polyurethane resin.

The acid group may be a carboxyl group, a sulfonic acid group, or the like. The acid group may be located at the terminal or side chain of the polyurethane resin, and is preferably located at least at the side chain. The acid group can be usually neutralized by a neutralizer (base), and may form a salt with the base. Further, the acid group can be bonded to an amino group (imino group or tertiary nitrogen atom) of the polyamine compound constituting the aqueous polyurethane resin.

The acid group-containing polyurethane resin may have an acid value selected within a range capable of imparting water solubility or water dispersibility. The acid group-containing polyurethane resin preferably has an acid value in a range of 5 to 100 mgKOH/g, more preferably 10 to 70 mgKOH/g, and still more preferably 15 to 60 mgKOH/g. When the acid value of the acid group-containing polyurethane resin is the lower limit or more, higher uniform dispersibility of the aqueous polyurethane resin and other materials and higher dispersion stability of the coating agent are easily obtained. When the acid value of the acid group-containing polyurethane resin is the upper limit or less, deterioration of gas barrier properties is easily prevented.

The acid value of the acid group-containing polyurethane resin is measured by a method according to JIS K0070.

The sum (total concentration) of the urethane group concentration and the urea group concentration of the acid group-containing polyurethane resin is preferably 15 mass % or more, and more preferably in a range of 20 to 60 mass %, from the viewpoint of gas barrier properties. When the total concentration is the lower limit or more, higher gas barrier properties are obtained. When the total concentration is the upper limit or less, the gas barrier layer is easily prevented from becoming rigid and brittle.

The urethane group concentration refers to a ratio of the molecular weight of a urethane group (59 g/equivalent) to the molecular weight of a repeating constituent unit of the polyurethane resin.

The urea group concentration refers to a ratio of the molecular weight of a urea group (primary amino group (amino group): 58 g/equivalent, secondary amino group (imino group): 57 g/equivalent) to the molecular weight of the repeating constituent unit of the polyurethane resin.

When a mixture is used as the acid group-containing polyurethane resin, the urethane group concentration and the urea group concentration can be calculated on the basis of the blending ratio of the reaction components, that is, on the basis of the ratio of the components used.

The acid group-containing polyurethane resin preferably has at least a rigid unit (a unit composed of a hydrocarbon ring) and a short-chain unit (for example, a unit composed of a hydrocarbon chain). That is, the repeating constituent unit of the acid group-containing polyurethane resin preferably includes a hydrocarbon ring (at least one of aromatic and non-aromatic hydrocarbon rings) derived from a polyisocyanate component, a polyhydroxy acid component, a polyol component, or a chain extender component (in particular, at least a polyisocyanate component).

The ratio of the unit composed of a hydrocarbon ring in the repeating constituent unit of the acid group-containing polyurethane resin is preferably in a range of 10 to 70 mass %, more preferably 15 to 65 mass %, and still more preferably 20 to 60 mass %. When the ratio of the unit composed of a hydrocarbon ring is the lower limit or more, deterioration of gas barrier properties is easily prevented. When the ratio of the unit composed of a hydrocarbon ring is the upper limit or less, the gas barrier layer is easily prevented from becoming rigid and brittle.

The number average molecular weight of the acid group-containing polyurethane resin can be appropriately selected, and is preferably in a range of 800 to 1,000,000, more preferably 800 to 200,000, and still more preferably 800 to 100,000. When the number average molecular weight of the acid group-containing polyurethane resin is the lower limit or more, deterioration of gas barrier properties is easily prevented. When the number average molecular weight of the acid group-containing polyurethane resin is the upper limit or less, increase in viscosity of the coating agent is easily prevented.

The number average molecular weight of the acid group-containing polyurethane resin is a value expressed in terms of a polystyrene standard, measured by gel permeation chromatography (GPC).

The acid group-containing polyurethane resin may be crystalline in order to enhance gas barrier properties.

The acid group-containing polyurethane resin preferably has a glass transition point in a range of 100 to 200° C., more preferably 110 to 180° C., and still more preferably 120 to 150° C. When the glass transition point of the acid group-containing polyurethane resin is the lower limit or more, deterioration of gas barrier properties is easily prevented.

The glass transition point of the acid group-containing polyurethane resin is measured by differential scanning calorimetry (DSC).

It is preferable that the aqueous polyurethane resin contains a neutralizer and is formed so that the acid group-containing polyurethane resin is dissolved or dispersed in an aqueous medium.

The aqueous medium is as described above.

The aqueous polyurethane resin may be in the form of an aqueous solution obtained by dissolving the acid group-containing polyurethane resin in an aqueous medium, or may be in the form of an aqueous dispersion obtained by dispersing the acid group-containing polyurethane resin in an aqueous medium.

The average particle size of dispersed particles (polyurethane resin particles) in the aqueous dispersion is not specifically limited, but is preferably in a range of 20 to 500 nm, more preferably 25 to 300 nm, and still more preferably 30 to 200 nm. When the average particle size of the dispersed particles is the lower limit or more, higher gas barrier properties are easily obtained. When the average particle size of the dispersed particles is the upper limit or less, deterioration of uniform dispersibility of the dispersed particles and other materials and deterioration of dispersion stability of the coating agent are easily prevented; thus, deterioration of gas barrier properties is easily prevented.

The average particle size of the dispersed particles is a value measured by a concentrated system particle size analyzer (FPAR-10, manufactured by Otsuka Electronics Co., Ltd.) when water is used as a dispersion medium and the solid content concentration is in a range of 0.03 to 0.3 mass %.

The aqueous polyurethane resin allows gas barrier properties to be exhibited due to a bond between the polyamine compound as a crosslinking agent and the acid group of the acid group-containing polyurethane resin. The bond between the polyamine compound and the acid group of the acid group-containing polyurethane resin may be an ionic bond (for example, an ionic bond between a tertiary amino group and a carboxyl group, or the like), or may be a covalent bond (for example, an amide bond or the like).

Thus, the polyamine compound is not specifically limited as long as the polyamine compound can be bonded to an acid group and improve oxygen barrier properties, and various compounds having two or more basic nitrogen atoms are used as the polyamine compound. The basic nitrogen atom is a nitrogen atom that can be bonded to the acid group of the acid group-containing polyurethane resin, and may be, for example, a nitrogen atom of an amino group such as a primary amino group, a secondary amino group, or a tertiary amino group.

The polyamine compound may be, for example, a polyamine compound having two or more amino groups of at least one type selected from the group consisting of a primary amino group, a secondary amino group, and a tertiary amino group.

Specific examples of the polyamine compound include alkylene diamines, polyalkylene polyamines, and silicon compounds having a plurality of basic nitrogen atoms. Examples of the alkylene diamines include alkylene diamines having 2 to 10 carbon atoms, such as ethylenediamine, 1,2-propylenediamine, 1,3-propylenediamine, 1,4-butanediamine, and 1,6-hexamethylenediamine. Examples of the polyalkylene polyamines include tetraalkylene polyamines. Examples of the silicon compounds having a plurality of basic nitrogen atoms (including nitrogen atoms of an amino group and the like) include silane coupling agents having a plurality of basic nitrogen atoms, such as 2-[N-(2-aminoethyl)amino]ethyltrimethoxysilane, and 3-[N-(2-aminoethyl)amino]propyltriethoxysilane.

The polyamine compound preferably has an amine value in a range of 100 to 1900 mgKOH/g, more preferably 150 to 1900 mgKOH/g, still more preferably 200 to 1900 mgKOH/g, particularly preferably 200 to 1700 mgKOH/g, and most preferably 300 to 1500 mgKOH/g. When the amine value of the polyamine compound is the lower limit or more, higher gas barrier properties are easily obtained. When the amine value of the polyamine compound is the upper limit or less, the aqueous polyurethane resin has high water dispersion stability.

The amine value of the polyamine compound is measured by the following method.

First, 0.5 to 2 g of sample is precisely weighed (sample amount S g). The precisely weighed sample is mixed with 30 g of ethanol, and dissolved therein. Bromophenol blue is added as an indicator to the obtained solution to perform titration with 0.2 mol/L of ethanol-hydrochloric acid solution (titer f). A point where the color of the solution changes to a color between green and yellow is set as an end point, and the titer (A mL) at the point is measured to calculate the amine value by using the following calculation formula 1.

$$\text{Amine value(mgKOH/g)} = A \times f \times 0.2 \times 56.108/S \quad \text{Calculation formula 1}$$

The content of the polyamine compound in the aqueous polyurethane resin is preferably such that the molar ratio between the acid group of the acid group-containing polyurethane resin and the basic nitrogen atoms of the polyamine compound (acid group/basic nitrogen atoms) is in a range of 10/1 to 0.1/1, and more preferably 5/1 to 0.2/1. When the molar ratio (acid group/basic nitrogen atoms) is in the above range, an appropriate crosslinking reaction occurs between the acid group of the acid group-containing polyurethane resin and the polyamine compound; thus, the gas barrier layer exhibits high oxygen barrier properties.

The aqueous polyurethane resin may be an aqueous polyurethane resin that is commercially available, or may be an aqueous polyurethane resin that is manufactured by a known manufacturing method.

The manufacturing method of the aqueous polyurethane resin is not specifically limited, and may be a common technique for converting a polyurethane resin into an aqueous polyurethane resin, such as an acetone method or a prepolymer method. In a urethanization reaction, a urethanization catalyst such as an amine catalyst, a tin catalyst, or a lead catalyst may be used as necessary.

For example, the aqueous polyurethane resin can be prepared by reacting a polyisocyanate compound, a polyhydroxy acid, and at least one of a polyol component and a chain extender component as necessary in an inert organic solvent such as ketones such as acetone, ethers such as tetrahydrofuran, or nitriles such as acetonitrile. More specifically, the aqueous polyurethane resin can be prepared by reacting a polyisocyanate compound, a polyhydroxy acid, and a polyol component in an inert organic solvent (in particular, a hydrophilic or water-soluble organic solvent) to generate a prepolymer having an isocyanate group at the terminal, followed by neutralization using a neutralizer and dissolution or dispersion in an aqueous medium, reaction with a chain extender component added thereto, and removal of the organic solvent.

<Other Components>

Examples of other components include additives such as reactive curing agents, antioxidants, weathering agents, heat stabilizers, lubricants, crystal nucleating agents, ultraviolet absorbers, plasticizers, antistatic agents, colorants, fillers, surfactants, and silane coupling agents that are made of polyisocyanates, carbodiimides, epoxy compounds, oxazolidone compounds, aziridine compounds, or the like.

<Content Ratio of Components>

The content of the water-soluble polymer in the coating agent to the total solid content in the coating agent is preferably in a range of 25 to 80 mass %, more preferably 30 to 75 mass %, and still more preferably 35 to 70 mass %. When the content of the water-soluble polymer is the lower limit or more, the inorganic layered mineral is easily dispersed. When the content of the water-soluble polymer is the upper limit or less, the inorganic layered mineral is easily uniformly dispersed.

The content of the inorganic layered mineral in the coating agent to the total solid content in the coating agent is preferably in a range of 3 to 20 mass %, more preferably 5 to 16 mass %, and still more preferably 7 to 12 mass %. When the content of the inorganic layered mineral is the lower limit or more, higher gas barrier properties of the gas barrier layer are easily obtained. When the content of the inorganic layered mineral is the upper limit or less, higher flexibility of the gas barrier layer is easily obtained.

The total content (solid content) of the water-soluble polymer, the inorganic layered mineral, and the aqueous polyurethane resin in the coating agent to the total solid content in the coating agent is preferably 85 mass % or more, more preferably 90 mass % or more, and still more preferably 95 mass %. The upper limit of the total content is not specifically limited, and may be 100 mass %.

The coating agent of the present embodiment can be prepared by mixing a water-soluble polymer, an inorganic layered mineral, and an aqueous polyurethane resin as necessary, other components as necessary, and an aqueous medium and the like as necessary. The order in which the components are mixed is not specifically limited.

Advantageous Effects

In the gas barrier film 10 described above, the number of protrusions 5b on the surface of the gas barrier layer 5 is 0 to 200 per mm$^2$, and the number of protrusions 5c on the surface of the gas barrier layer 5 is 20 or more per mm$^2$; thus, providing excellent gas barrier properties and preventing the occurrence of blocking. The prevention of the occurrence of blocking allows good processability, leading to easy post-processing such as slitting or lamination.

The configurations and combinations thereof, and the like of the present embodiment are examples, and additions, omissions, substitutions, and other changes in configuration are possible without departing from the spirit of the present invention.

For example, in the example described above, the substrate film 1 contains the anti-blocking agent 3, and the protrusions 5b and 5c are derived from the anti-blocking agent 3, but the gas barrier film 10 may be configured such that the substrate film 1 contains no anti-blocking agent and the protrusions 5b and 5c are not derived from the anti-blocking agent 3. For example, the protrusions 5b and 5c may be derived from a foreign substance contained in the gas barrier layer 5. From the viewpoint of the effect of successfully preventing blocking, the gas barrier film 10 is preferably configured such that the substrate film 1 contains the anti-blocking agent 3 and the protrusions 5b and 5c which are derived from the anti-blocking agent 3.

The gas barrier film may also include, as necessary, a printing layer, an anchor coat layer, an overcoat layer, a light shielding layer, an adhesive layer, a heat seal layer that can be heat-sealed, other functional layers, and the like.

When the gas barrier film includes a heat seal layer that can be heat-sealed, the heat seal layer is preferably located on at least one outermost surface of the gas barrier film. In the case where the gas barrier film includes the heat seal layer, the gas barrier film can be hermetically sealed by heat sealing.

The heat seal layer can be laminated, for example, on a laminate in which the gas barrier layer 5 is provided on at least the first surface 1a of the substrate film 1, by using a known adhesive such as a polyurethane adhesive, a polyester adhesive, or a polyether adhesive by a known method such as dry lamination or extrusion lamination.

A second embodiment of the present invention will be described.

Figure 3:
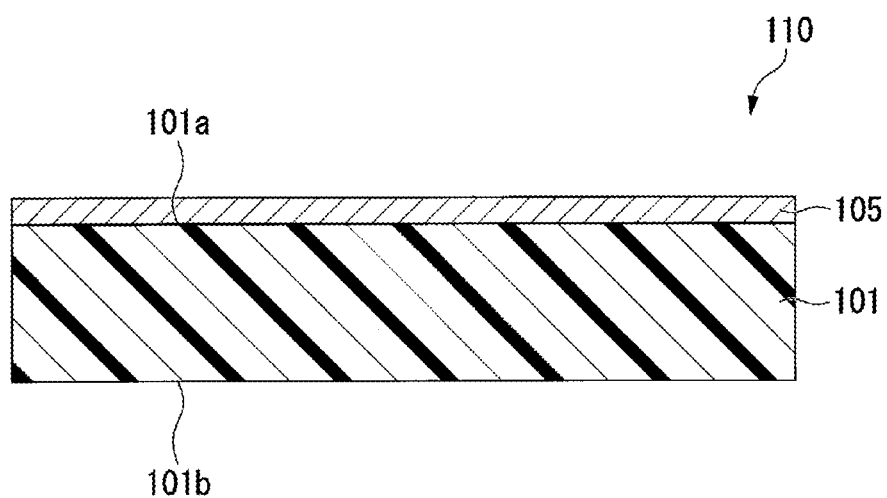
FIG. 3 is a schematic cross-sectional view showing an example of a gas barrier film according to a second embodiment of the present invention.

FIG. 3 is a schematic cross-sectional view of a gas barrier film 110 according to the present embodiment.

The gas barrier film 110 includes a substrate film 101, and a gas barrier layer 105 that in contact with a first surface 101a (one surface) of the substrate film 101.

The gas barrier layer 105 is provided only on the first surface 101a of the substrate film 101.

Figure 4:
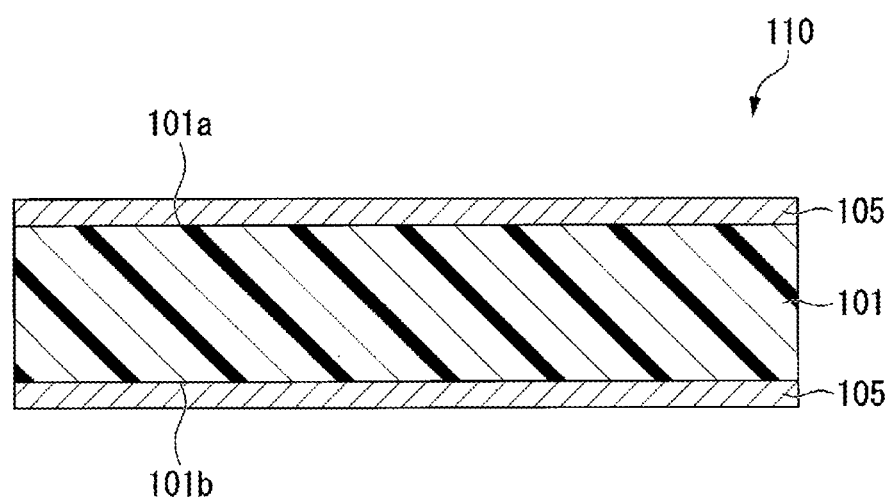
FIG. 4 is a schematic cross-sectional view showing another example of the above gas barrier film.

FIG. 4 is a schematic cross-sectional view of a gas barrier film 110A according to the present embodiment.

The gas barrier film 110 includes a substrate film 101, and two gas barrier layers 105, one of which is located in contact with a first surface 101a (one surface) of the substrate film

101 and the other of which is located in contact with a second surface 101b (the other surface) of the substrate film 101 opposite to the first surface 101a.

(Substrate Film)

The substrate film 101 contains a resin.

Examples of the resin include polyolefin resins, polyester resins, polyamide resins, vinyl resins, acrylic resins, and cellophane. Examples of the polyolefin resins include homopolymers and copolymers of olefins having 2 to 10 carbon atoms, and specific examples include polyethylene, polypropylene, poly(1-butene), an ethylene-propylene copolymer, an ethylene-1-butene copolymer, an ethylene-propylene-1-butene copolymer, an ethylene-acrylic acid copolymer, an ionomer obtained by cross-linking an ethylene-acrylic acid copolymer with metal ions, a propylene-1-butene copolymer, and a propylene-pentene copolymer. Examples of the polyester resins include polyethylene terephthalate and polybutylene terephthalate. Examples of the polyamide resins include aliphatic polyamides such as nylon 6 and nylon 66, and aromatic polyamides such as polymetaxylylene adipamide. Examples of the vinyl resins include polystyrene, polyvinyl acetate, an ethylene-vinyl acetate copolymer, polyvinyl alcohol, and an ethylene-vinyl alcohol copolymer. Examples of the acrylic resins include homopolymers and copolymers of (meth)acrylic monomers such as (meth)acrylate and (meth)acrylonitrile, and specific examples include polymethyl methacrylate and polyacrylonitrile. (Meth)acryl is a general term for acryl and methacryl, and the same applies to (meth)acrylate and (meth)acrylonitrile. These resins may be used singly or in combination of two or more.

The substrate film 101 contains an anti-blocking agent 103. The anti-blocking agent 103 is dispersed in the substrate film 101.

On each of the first surface 101a and the second surface 101b of the substrate film 101, a plurality of protrusions derived from the anti-blocking agent 103 are locally present. The anti-blocking agent 103 may be exposed or covered with a resin on the first surface 101a and the second surface 101b. The protrusions will be described later in detail.

The anti-blocking agent 103 causes protrusions on a surface of the gas barrier film 110 (a surface of the gas barrier layer 105 or the surface of the substrate film 101) to enhance blocking resistance of the gas barrier film 110, leading to higher processability of the gas barrier film 110.

The anti-blocking agent 103 is in the form of solid particles, and may be organic particles, inorganic particles, or the like. Examples of the organic particles include acrylic resin particles such as particles of polymethyl methacrylate, polystyrene particles, and polyamide particles. These organic particles are obtained, for example, by emulsion polymerization, suspension polymerization, or the like. Examples of the inorganic particles include particles of silica, zeolite, talc, diatomaceous earth, kaolinite, and feldspar. These anti-blocking agents may be used singly or in combination of two or more.

The anti-blocking agent 103 has an average particle size of, for example, 0.4 to 10 μm. The average particle size is a median diameter measured by using a Coulter counter.

The substrate film 101 may further contain additives other than the anti-blocking agent 103. Examples of such additives include fillers, surfactants, antistatic agents such as metal oxides, lubricants, slip agents, heat-resistance stabilizers, weather-resistance stabilizers, antioxidants, filling materials, antifogging agents, ultraviolet absorbers, nucleating agents, pigments, and dyes.

The substrate film 101 may be a single-layer film made of a single resin, a single-layer or laminated film made of a plurality of resins, or a laminated film in which a resin layer and another substrate (metal, wood, paper, ceramic, or the like) are laminated.

An example of the laminated film made of a plurality of resins is a film in which a first surface layer containing a resin and an anti-blocking agent, a base layer containing a resin but not containing an anti-blocking agent, and a second surface layer containing a resin and an anti-blocking agent are laminated in this order from the first surface 101a side.

From the viewpoint of ease of availability and water vapor barrier properties, the substrate film 101 is preferably a polyolefin resin film (in particular, a polypropylene film or the like), a polyester resin film (in particular, a polyethylene terephthalate resin film), or a polyamide resin film (in particular, a nylon film), and particularly preferably a polyolefin resin film.

The substrate film 101 may be an unstretched film, or may be a uniaxially or biaxially stretched oriented film.

The substrate film 101 may be a film subjected to surface treatment (corona discharge treatment, low-temperature plasma treatment, or the like), or anchor coat or undercoat treatment. For example, by performing corona treatment or low-temperature plasma treatment on the surface of the substrate film 101 on which the gas barrier layer 105 is to be formed, it is possible to improve wettability to a coating agent and adhesion strength to the gas barrier layer 105.

Figure 5:
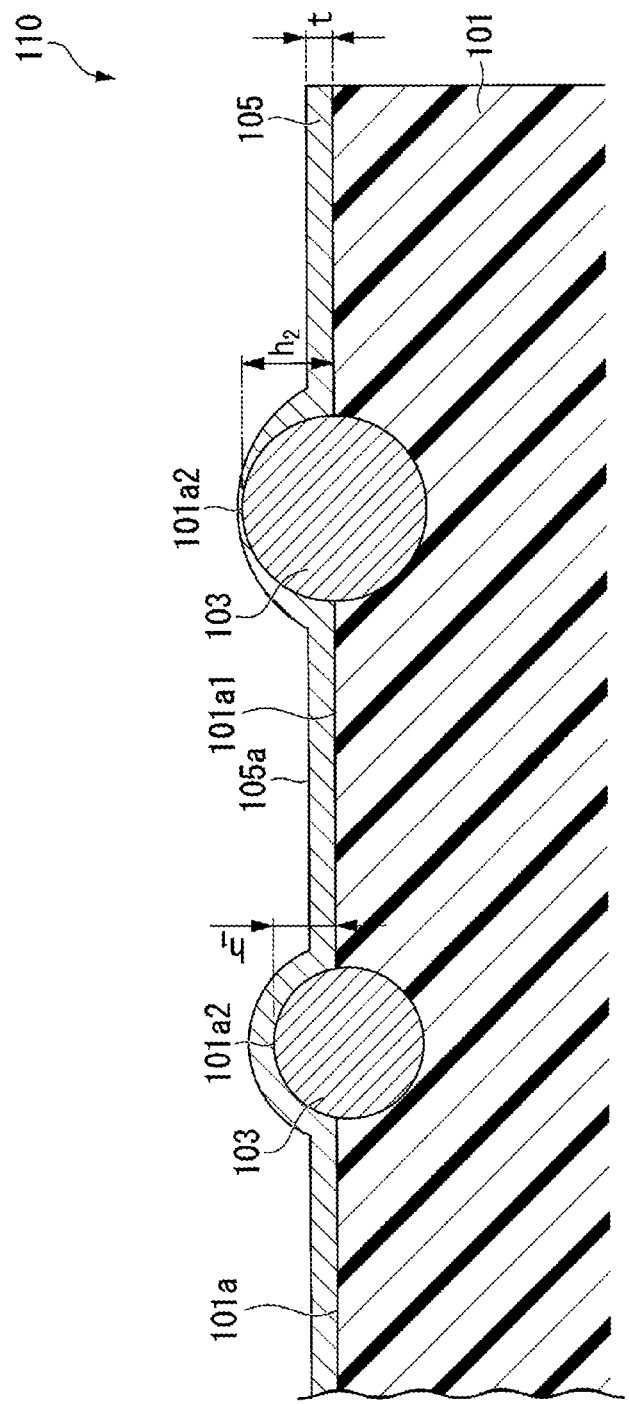
FIG. 5 is a partial enlarged view of the schematic cross-sectional view in FIG. 3 or 4.

As shown in FIG. 5, the first surface 101a of the substrate film 101 has a flat portion 101a1, and locally has a plurality of protrusions 101a2 that protrude from the flat portion 101a1.

The plurality of protrusions 101a2 are mainly derived from the anti-blocking agent 3, but the first surface 101a may have protrusions derived from a material other than the anti-blocking agent 3 (not shown).

On the first surface 101a, among the plurality of protrusions 101a2, an average height h of protrusions having a height of 0.3 μm or more is preferably 0.5 to 2.5 μm, and more preferably 0.6 to 2.0 μm. When the average height h is the lower limit or more of the above range, higher blocking resistance is obtained. When the average height h is the upper limit or less of the above range, the substrate film 101 has high transparency. Furthermore, detaching of the anti-blocking agent from the substrate film 101 is prevented.

The height of the protrusion 101a2 is the height at the apex of the protrusion 101a2 with respect to the flat portion 101a1 in the thickness direction of the substrate film 101.

The average height h of the protrusions 101a2 having a height of 0.3 μm or more is calculated by the following measurement method.

<Method of Measuring Average Height h>

In a randomly selected region of 0.66 mm$^2$ or more on the first surface 101a, the height of each of the plurality of protrusions 101a2 is measured by using a 3D measurement laser microscope (LEXT OLS4000, manufactured by Olympus Corporation). Specifically, the height at the apex of protruding portions from the flat portion 101a1 is measured under the following conditions. Then, a protruding portion whose height is the height of the flat portion 101a1+0.3 μm or more is determined as a protrusion 101a2, and the average height (μm) of all the protrusions 101a2 in the measurement region is calculated, and the calculated average height is determined as h.

Lens: Objective lens, magnification 50 times (MPLAPONLEXT50)

Measurement area: 514 μm×1285 μm

Filter: Surface correction
Mode: Measurement in profile mode of height at apex of protruding portions from flat portion The average height of the protrusions 101a2 is calculated by h=Σhi/n. In the formula, n represents the number of protrusions 101a2 having a height of 0.3 μm or more in the region, and hi represents the height of the ith (i is an integer from 1 to n) protrusion 101a2 of n protrusions 101a2.

Figure 6:
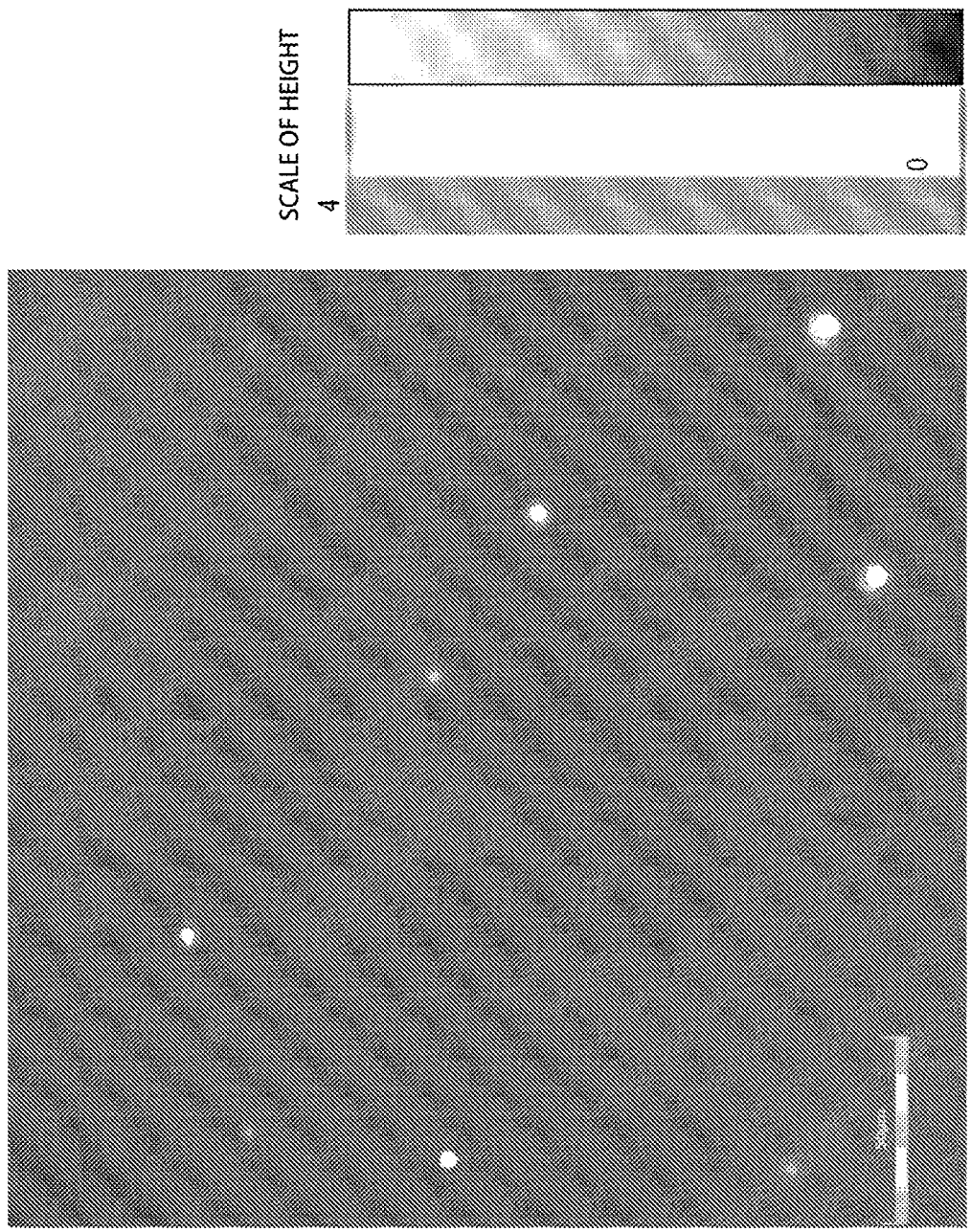
FIG. 6 is a contour map of the height of protruding portions on a corona-treated surface of a substrate film used in an example.

The measurement of the height of the protrusions described above provides a contour map of the surface of the substrate film 101 as shown in FIG. 6. In FIG. 6, a higher brightness indicates greater height.

The number of protrusions 101a2 having a height of 0.3 μm or more that are present on the first surface 101a of the substrate film 101 is preferably 10 to 1000 per mm$^2$, and more preferably 50 to 300 per mm$^2$. When the number of protrusions 101a2 having a height of 0.3 μm or more is the lower limit or more of the above range, higher blocking resistance is obtained, and when the number of protrusions 101a2 having a height of 0.3 μm or more is the upper limit or less of the above range, higher gas barrier properties are obtained.

The size of the protrusions 101a2 can be controlled by changing the average particle size of the anti-blocking agent, or the like. The number of protrusions 101a2 having a height of 0.3 μm or more can be controlled by changing the amount of anti-blocking agent to be added.

When t represents the thickness (μm) of the gas barrier layer, the number of protrusions 101a2 having a height (5×t) μm or more that are present on the first surface 101a of the substrate film 101 is preferably 10 or less per mm$^2$, and more preferably 7 or less per mm$^2$. The lower limit is not specifically limited, and may be 0 per mm$^2$. The protrusions 101a2 having a height 5t μm or more may cause defects having a relatively large area in the gas barrier layer 105. When the number of protrusions 101a2 having a height 5t μm or more is the upper limit or less, the total area of the defects can be sufficiently small, leading to higher gas barrier properties.

The ratio of the number of protrusions 101a2 having a height (5×t) μm or more to the total number of protrusions 101a2 having a height of 0.3 μm or more that are present on the first surface 101a of the substrate film 101 is preferably 10% or less, and more preferably 5% or less. The lower limit is not specifically limited, and may be 0%. As the ratio of the protrusions 101a2 having a height (5×t) μm or more is lower, the total area of the defect in the gas barrier layer 105 can be smaller, leading to better gas barrier properties.

When the second surface 101b is in contact with the gas barrier layer 105 as shown in FIG. 4, the second surface 101b also has a flat portion and a plurality of protrusions as with the first surface 101a. The average height h of protrusions having a height of 0.3 μm or more and the number thereof, the number of protrusions having a height (5×t) μm or more, and the preferable ranges of the respective values are the same as those of the first surface 101a.

When the second surface 101b is not in contact with the gas barrier layer 105 as shown in FIG. 3, the second surface 101b may have a flat portion and a plurality of protrusions, or may have a flat portion and no protrusions.

The thickness of the substrate film 101 is not specifically limited, and is appropriately selected according to the price and application, taking into consideration suitability as a packaging material and suitability for lamination of other films. The thickness of the substrate film 101 is practically in a range of 3 μm to 200 μm, preferably 5 μm to 120 μm, and more preferably 10 μm to 100 μm.

The thickness of the substrate film 101 is the thickness between the flat portion 101a1 of the first surface 101a and the flat portion of the second surface 101b (minimum distance from the flat portion 101a1 of the first surface 101a to the flat portion of the second surface 101b). The thickness is measured by observing a cross section in the thickness direction of the substrate film 101 or the gas barrier film 110 by using a scanning electron microscope (SEM).

(Gas Barrier Layer)

The gas barrier layer 105 may be a gas barrier layer known as an oxygen barrier film formed by a wet coating method.

The gas barrier layer 105 is obtained by forming a coating film made of a coating agent on the first surface 101a of the substrate film 101 by a wet coating method, and drying the coating film. The term coating film refers to a wet film, and the term film refers to a dry film.

The gas barrier layer 105 is preferably a film (inorganic layered mineral composite resin film) formed of a coating agent containing a water-soluble polymer and an inorganic layered mineral. A gas barrier film including an inorganic layered mineral composite resin film as a gas barrier layer has advantages such as high oxygen barrier properties even in a high humidity atmosphere, adhesion strength to other materials and film cohesive strength sufficient as a packaging material, transparency and stretch resistance that a metal foil or a metal vapor deposition film does not have, and no risk of generating harmful substances such as dioxins. The coating agent will be described later in detail.

Corresponding to the first surface 101a of the substrate film 101, a surface (surface facing away from the substrate film 101) of the gas barrier layer 105 has a flat portion 105a, and locally has a plurality of protrusions that protrude from the flat portion 105a. The plurality of protrusions on the surface of the gas barrier layer 105 are formed at the respective positions corresponding to the plurality of protrusions 101a2 on the first surface 101a.

The gas barrier layer 105 has a thickness t(μm) that satisfies the following formula (3). In the formula (3), h represents the average height (μm) of the protrusions 101a2 having a height of 0.3 μm or more that are present on the first surface 101a of the substrate film 101.

$$0.25 \times h + 0.15 \leq t \leq 0.8 \times h \quad (3)$$

The thickness t of the gas barrier layer 105 is the thickness of the gas barrier layer 105 at the flat portion 105a. The thickness t is measured by observing a cross section in the thickness direction of the gas barrier film 110 by using a scanning electron microscope (SEM).

When the thickness t of the gas barrier layer 105 is (0.25×h+0.15) μm or more, the gas barrier layer 105 has less pinhole defects at the protrusion 101a2; thus, high oxygen barrier properties are stably obtained. When the thickness t of the gas barrier layer 105 is (0.8×h) μm or less, it is possible to prevent increases in drying load and high material cost due to the application of a large amount of coating agent. Furthermore, the gas barrier film 110 has high blocking resistance, leading to good processability.

The thickness t of the gas barrier layer 105 is not specifically limited as long as the thickness t satisfies the formula (3), and is preferably 0.3 to 1.5 μm, and more preferably 0.4 to 1.0 μm. When the thickness t is the lower limit or more of the above range, high oxygen barrier properties are more stably obtained. When the thickness t is the upper limit or less of the above range, the amount of applied coating agent is sufficiently small, leading to a lower drying load and lower material cost.

(Method of Manufacturing Gas Barrier Film)

The gas barrier film 110 can be manufactured by forming the gas barrier layer 105 on at least the first surface 101a (only the first surface 101a or both the first surface 101a and the second surface 101b) of the substrate film 101.

The substrate film 101 may be a substrate film that is commercially available, or may be a substrate film that is manufactured by a known method.

As described above, the gas barrier layer 105 is obtained by forming a coating film made of a coating agent on at least the first surface 101a of the substrate film 101 by a wet coating method, and drying the coating film.

The wet coating method may be a known wet coating method such as a roll coating method, a gravure coating method, a reverse coating method, a die coating method, a screen printing method, or a spray coating method.

The coating film made of the coating agent may be dried by a known drying method such as hot-air drying, heat roll drying, or infrared irradiation. The drying temperature for the coating film is preferably in a range of 50 to 200° C., for example. The drying time varies depending on the thickness of the coating film, the drying temperature, and the like, but is preferably in a range of 1 second to 5 minutes, for example.

(Coating Agent)

As described above, a preferable embodiment of the coating agent is a coating agent containing a water-soluble polymer and an inorganic layered mineral.

The coating agent of the present embodiment typically further contains an aqueous medium.

The coating agent of the present embodiment preferably further contains an aqueous polyurethane resin.

The coating agent of the present embodiment may further contain other components as necessary to such an extent that gas barrier properties and strength as a packaging material are not impaired.

<Water-Soluble Polymer>

The water-soluble polymer refers to a polymer that can be dissolved in water. The dissolved state refers to a state in which a polymer as a solute is dispersed at molecular chain level in water as a solvent to form a homogeneous system. More specifically, the dissolved state refers to a state in which intermolecular force between polymer chains and water molecules is stronger than that between the polymer chains such that the polymer chains are disentangled and uniformly dispersed in water.

The water-soluble polymer is preferably a compound that can be inserted and coordinated (intercalated) between unit crystals of the inorganic layered mineral.

Specific examples of the water-soluble polymer include polyvinyl alcohol resins (polyvinyl alcohol polymer and derivatives thereof, and the like), other vinyl polymers (polyvinylpyrrolidone, polyacrylic acid, polymethacrylic acid, and esters and salts thereof, and copolymers thereof, polyhydroxyethyl methacrylate and copolymers thereof, and the like), cellulose derivatives (carboxymethyl cellulose, hydroxyethyl cellulose, and the like), starches (oxidized starch, etherified starch, dextrin, and the like), copolyesters having a polar group (polyesters having a sulfoisophthalic acid structure, and the like), and urethane polymers (except for an aqueous polyurethane resin (described later)), and functional group-modified polymers with a modified carboxyl group or the like of these various polymers.

In consideration of the film cohesive strength, the water-soluble polymer preferably has a polymerization degree of 200 or more.

The coating agent of the present embodiment may contain one or more types of water-soluble polymers.

The water-soluble polymer preferably contains at least a polyvinyl alcohol resin, and more preferably contains a polyvinyl alcohol resin having a saponification degree of 95% or more and a polymerization degree of 300 or more. The polymerization degree of the polyvinyl alcohol resin is preferably in a range of 300 to 2400, and more preferably 450 to 2000. The polyvinyl alcohol resin having a higher saponification degree and a higher polymerization degree has lower hygroscopic and swelling properties. When the saponification degree of the polyvinyl alcohol resin is 95% or more, sufficient gas barrier properties are easily obtained. When the polymerization degree of the polyvinyl alcohol resin is 2400 or less, the coating agent has a sufficiently low viscosity, and this makes it easy to uniformly mix the coating agent with other components; thus, a problem such as lower gas barrier properties or lower adhesion strength is less likely to occur.

<Inorganic Layered Mineral>

The inorganic layered mineral refers to an inorganic compound in which extremely thin (for example, 10 to 500 nm thickness) unit crystal layers are layered to form a single layered particle. The inorganic layered mineral is used to further enhance gas barrier properties of the gas barrier layer.

The inorganic layered mineral is preferably a compound having one or both of swelling properties and cleavage properties in water, and particularly preferably a clay compound having water swelling properties. More specifically, the inorganic layered mineral is preferably a clay compound in which water is coordinated between extremely thin unit crystal layers and that has one or both of absorption properties and swelling properties. Such a clay compound is generally a compound having a layered structure in which layers having a tetrahedral structure with $Si^{4+}$ coordinated to $O^{2-}$ and layers having an octahedral structure with $Al^{3+}$, $Mg^{2+}$, $Fe^{2+}$, $Fe^{3+}$ and the like coordinated to $O^{2-}$ and $OH^-$ are bonded at a ratio of 1:1 or 2:1 and stacked. The clay compound may be a natural compound or a synthetic compound.

Typical examples of the inorganic layered mineral include hydrous silicates such as phyllosilicate minerals, and include, for example, kaolinite clay minerals such as halloysite, kaolinite, endellite, dickite, and nacrite; antigorite clay minerals such as antigorite and chrysotile; smectite clay minerals such as montmorillonite, beidellite, nontronite, saponite, hectorite, sauconite, and stevensite; vermiculite clay minerals such as vermiculite; micas and mica clay minerals such as white mica, bronze mica, margarite, tetrasilicic mica, and taeniolite. These inorganic layered minerals may be used singly or in combination of two or more.

In particular, the inorganic layered mineral is preferably a smectite clay mineral such as montmorillonite, or a mica clay mineral such as water-swellable mica.

The inorganic layered mineral preferably has an average particle size of 10 μm or less and a thickness of 500 nm or less. When the average particle size and the thickness are the respective upper limits or less, the particles of the inorganic layered mineral are easily uniformly arranged in the gas barrier layer made of the coating agent, leading to higher gas barrier properties and higher film cohesive strength.

The lower limit of the average particle size of the inorganic layered mineral is, for example, 1 μm.

The lower limit of the thickness of the inorganic layered mineral is, for example, 1 nm.

The average particle size of the inorganic layered mineral is measured by a laser diffraction and scattering method.

The thickness of the inorganic layered mineral is measured by an X-ray diffraction method.

<Aqueous Medium>

The aqueous medium may be water, a water-soluble or hydrophilic organic solvent, or a mixed solvent thereof. The aqueous medium is preferably water or a mixed solvent containing water as a main component.

The content of water in the aqueous medium is preferably 50 mass % or more, and more preferably 70 mass % or more.

Examples of the water-soluble or hydrophilic organic solvent include alcohols such as ethanol and isopropanol; ketones such as acetone and methyl ethyl ketone; ethers such as tetrahydrofuran; cellosolves; carbitols; and nitriles such as acetonitrile.

<Aqueous Polyurethane Resin>

The aqueous polyurethane resin contains a polyurethane resin having an acid group (hereinafter also referred to as an "acid group-containing polyurethane resin"), and a polyamine compound. The aqueous polyurethane resin is used to impart flexibility and gas barrier properties, in particular, oxygen barrier properties, to the gas barrier layer.

The aqueous polyurethane resin allows gas barrier properties to be exhibited due to a bond between the acid group of the acid group-containing polyurethane resin and the polyamine compound as a crosslinking agent. The bond between the acid group of the acid group-containing polyurethane resin and the polyamine compound may be an ionic bond (for example, an ionic bond between a carboxyl group and a tertiary amino group, or the like), or may be a covalent bond (for example, an amide bond or the like).

Since the acid group-containing polyurethane resin constituting the aqueous polyurethane resin has an acid group, the acid group-containing polyurethane resin is anionic and self-emulsifying, and is thus also referred to as an anionic self-emulsifying polyurethane resin.

The acid group may be a carboxyl group, a sulfonic acid group, or the like. The acid group may be located at the terminal or side chain of the polyurethane resin, and is preferably located at least at the side chain. The acid group can be usually neutralized by a neutralizer (base), and may form a salt with the base. Further, the acid group can be bonded to an amino group (imino group or tertiary nitrogen atom) of the polyamine compound constituting the aqueous polyurethane resin.

The acid group-containing polyurethane resin may have an acid value selected within a range capable of imparting water solubility or water dispersibility. The acid group-containing polyurethane resin preferably has an acid value in a range of 5 to 100 mgKOH/g, more preferably 10 to 70 mgKOH/g, and still more preferably 15 to 60 mgKOH/g. When the acid value of the acid group-containing polyurethane resin is the lower limit or more, higher uniform dispersibility of the aqueous polyurethane resin and other materials and higher dispersion stability of the coating agent are easily obtained. When the acid value of the acid group-containing polyurethane resin is the upper limit or less, deterioration of gas barrier properties is easily prevented.

The acid value of the acid group-containing polyurethane resin is measured by a method according to JIS K0070.

The sum (total concentration) of the urethane group concentration and the urea group concentration of the acid group-containing polyurethane resin is preferably 15 mass % or more, and more preferably in a range of 20 to 60 mass %, from the viewpoint of gas barrier properties. When the total concentration is the lower limit or more, higher gas barrier properties are obtained. When the total concentration is the upper limit or less, the gas barrier layer is easily prevented from becoming rigid and brittle.

The urethane group concentration refers to a ratio of the molecular weight of a urethane group (59 g/equivalent) to the molecular weight of a repeating constituent unit of the polyurethane resin.

The urea group concentration refers to a ratio of the molecular weight of a urea group (primary amino group (amino group): 58 g/equivalent, secondary amino group (imino group): 57 g/equivalent) to the molecular weight of the repeating constituent unit of the polyurethane resin.

When a mixture is used as the acid group-containing polyurethane resin, the urethane group concentration and the urea group concentration can be calculated on the basis of the blending ratio of the reaction components, that is, on the basis of the ratio of the components used.

The acid group-containing polyurethane resin preferably has at least a rigid unit (a unit composed of a hydrocarbon ring) and a short-chain unit (for example, a unit composed of a hydrocarbon chain). That is, the repeating constituent unit of the acid group-containing polyurethane resin preferably includes a hydrocarbon ring (at least one of aromatic and non-aromatic hydrocarbon rings) derived from a polyisocyanate component, a polyhydroxy acid component, a polyol component, or a chain extender component (in particular, at least a polyisocyanate component).

The ratio of the unit composed of a hydrocarbon ring in the repeating constituent unit of the acid group-containing polyurethane resin is preferably in a range of 10 to 70 mass %, more preferably 15 to 65 mass %, and still more preferably 20 to 60 mass %. When the ratio of the unit composed of a hydrocarbon ring is the lower limit or more, deterioration of gas barrier properties is easily prevented. When the ratio of the unit composed of a hydrocarbon ring is the upper limit or less, the gas barrier layer is easily prevented from becoming rigid and brittle.

The number average molecular weight of the acid group-containing polyurethane resin can be appropriately selected, and is preferably in a range of 800 to 1,000,000, more preferably 800 to 200,000, and still more preferably 800 to 100,000. When the number average molecular weight of the acid group-containing polyurethane resin is the lower limit or more, deterioration of gas barrier properties is easily prevented. When the number average molecular weight of the acid group-containing polyurethane resin is the upper limit or less, increase in viscosity of the coating agent is easily prevented.

The number average molecular weight of the acid group-containing polyurethane resin is a value expressed in terms of a polystyrene standard, measured by gel permeation chromatography (GPC).

The acid group-containing polyurethane resin may be crystalline in order to enhance gas barrier properties.

The acid group-containing polyurethane resin preferably has a glass transition point in a range of 100 to 200° C., more preferably 110 to 180° C., and still more preferably 120 to 150° C. When the glass transition point of the acid group-containing polyurethane resin is the lower limit or more, deterioration of gas barrier properties is easily prevented.

The glass transition point of the acid group-containing polyurethane resin is measured by differential scanning calorimetry (DSC).

It is preferable that the aqueous polyurethane resin contains a neutralizer and is formed so that the acid group-containing polyurethane resin is dissolved or dispersed in an aqueous medium.

The aqueous medium is as described above.

The aqueous polyurethane resin may be in the form of an aqueous solution obtained by dissolving the acid group-containing polyurethane resin in an aqueous medium, or may be in the form of an aqueous dispersion obtained by dispersing the acid group-containing polyurethane resin in an aqueous medium.

The average particle size of dispersed particles (polyurethane resin particles) in the aqueous dispersion is not specifically limited, but is preferably in a range of 20 to 500 nm, more preferably 25 to 300 nm, and still more preferably 30 to 200 nm. When the average particle size of the dispersed particles is the lower limit or more, higher gas barrier properties are easily obtained. When the average particle size of the dispersed particles is the upper limit or less, deterioration of uniform dispersibility of the dispersed particles and other materials and deterioration of dispersion stability of the coating agent are easily prevented; thus, deterioration of gas barrier properties is easily prevented.

The average particle size of the dispersed particles is a value measured by a concentrated system particle size analyzer (FPAR-10, manufactured by Otsuka Electronics Co., Ltd.) when water is used as a dispersion medium and the solid content concentration is in a range of 0.03 to 0.3 mass %.

The aqueous polyurethane resin allows gas barrier properties to be exhibited due to a bond between the polyamine compound as a crosslinking agent and the acid group of the acid group-containing polyurethane resin. The bond between the polyamine compound and the acid group of the acid group-containing polyurethane resin may be an ionic bond (for example, an ionic bond between a tertiary amino group and a carboxyl group, or the like), or may be a covalent bond (for example, an amide bond or the like).

Thus, the polyamine compound is not specifically limited as long as the polyamine compound can be bonded to an acid group and improve oxygen barrier properties, and various compounds having two or more basic nitrogen atoms are used as the polyamine compound. The basic nitrogen atom is a nitrogen atom that can be bonded to the acid group of the acid group-containing polyurethane resin, and may be, for example, a nitrogen atom of an amino group such as a primary amino group, a secondary amino group, or a tertiary amino group.

The polyamine compound may be, for example, a polyamine compound having two or more amino groups of at least one type selected from the group consisting of a primary amino group, a secondary amino group, and a tertiary amino group.

Specific examples of the polyamine compound include alkylene diamines, polyalkylene polyamines, and silicon compounds having a plurality of basic nitrogen atoms. Examples of the alkylene diamines include alkylene diamines having 2 to 10 carbon atoms, such as ethylenediamine, 1,2-propylenediamine, 1,3-propylenediamine, 1,4-butanediamine, and 1,6-hexamethylenediamine. Examples of the polyalkylene polyamines include tetraalkylene polyamines. Examples of the silicon compounds having a plurality of basic nitrogen atoms (including nitrogen atoms of an amino group and the like) include silane coupling agents having a plurality of basic nitrogen atoms, such as 2-[N-(2-aminoethyl)amino]ethyltrimethoxysilane, and 3-[N-(2-aminoethyl)amino]propyltriethoxysilane.

The polyamine compound preferably has an amine value in a range of 100 to 1900 mgKOH/g, more preferably 150 to 1900 mgKOH/g, still more preferably 200 to 1900 mgKOH/g, particularly preferably 200 to 1700 mgKOH/g, and most preferably 300 to 1500 mgKOH/g. When the amine value of the polyamine compound is the lower limit or more, higher gas barrier properties are easily obtained. When the amine value of the polyamine compound is the upper limit or less, the aqueous polyurethane resin has high water dispersion stability.

The amine value of the polyamine compound is measured by the following method.

First, 0.5 to 2 g of sample is precisely weighed (sample amount S g). The precisely weighed sample is mixed with 30 g of ethanol, and dissolved therein. Bromophenol blue is added as an indicator to the obtained solution to perform titration with 0.2 mol/L of ethanol-hydrochloric acid solution (titer f). A point where the color of the solution changes to a color between green and yellow is set as an end point, and the titer (A mL) at the point is measured to calculate the amine value by using the formula 1 described above.

The content of the polyamine compound in the aqueous polyurethane resin is preferably such that the molar ratio between the acid group of the acid group-containing polyurethane resin and the basic nitrogen atoms of the polyamine compound (acid group/basic nitrogen atoms) is in a range of 10/1 to 0.1/1, and more preferably 5/1 to 0.2/1. When the molar ratio (acid group/basic nitrogen atoms) is in the above range, an appropriate crosslinking reaction occurs between the acid group of the acid group-containing polyurethane resin and the polyamine compound; thus, the gas barrier layer exhibits high oxygen barrier properties.

The aqueous polyurethane resin may be an aqueous polyurethane resin that is commercially available, or may be an aqueous polyurethane resin that is manufactured by a known manufacturing method.

The manufacturing method of the aqueous polyurethane resin is not specifically limited, and may be a common technique for converting a polyurethane resin into an aqueous polyurethane resin, such as an acetone method or a prepolymer method. In a urethanization reaction, a urethanization catalyst such as an amine catalyst, a tin catalyst, or a lead catalyst may be used as necessary.

For example, the aqueous polyurethane resin can be prepared by reacting a polyisocyanate compound, a polyhydroxy acid, and at least one of a polyol component and a chain extender component as necessary in an inert organic solvent such as ketones such as acetone, ethers such as tetrahydrofuran, or nitriles such as acetonitrile. More specifically, the aqueous polyurethane resin can be prepared by reacting a polyisocyanate compound, a polyhydroxy acid, and a polyol component in an inert organic solvent (in particular, a hydrophilic or water-soluble organic solvent) to generate a prepolymer having an isocyanate group at the terminal, followed by neutralization using a neutralizer and dissolution or dispersion in an aqueous medium, reaction with a chain extender component added thereto, and removal of the organic solvent.

<Other Components>

Examples of other components include reactive curing agents such as, polyisocyanate, carbodiimide, epoxy compounds, oxazolidone compounds, aziridine compounds, or the like, and additives such as antioxidants, weathering agents, heat stabilizers, lubricants, crystal nucleating agents, ultraviolet absorbers, plasticizers, antistatic agents, colorants, fillers, surfactants, and silane coupling agents, or the like.

<Content Ratio of Components>

The content of the water-soluble polymer in the coating agent to the total solid content in the coating agent is preferably in a range of 25 to 80 mass %, more preferably 30 to 75 mass %, and still more preferably 35 to 70 mass %. When the content of the water-soluble polymer is the lower limit or more, the inorganic layered mineral is easily dispersed. When the content of the water-soluble polymer is the upper limit or less, the inorganic layered mineral is easily uniformly dispersed.

The content of the inorganic layered mineral in the coating agent to the total solid content in the coating agent is preferably in a range of 3 to 20 mass %, more preferably 5 to 16 mass %, and still more preferably 7 to 12 mass %. When the content of the inorganic layered mineral is the lower limit or more, higher gas barrier properties of the gas barrier layer are easily obtained. When the content of the inorganic layered mineral is the upper limit or less, higher flexibility of the gas barrier layer is easily obtained.

The total content (solid content) of the water-soluble polymer, the inorganic layered mineral, and the aqueous polyurethane resin in the coating agent to the total solid content in the coating agent is preferably 85 mass % or more, more preferably 90 mass % or more, and still more preferably 95 mass %. The upper limit of the total content is not specifically limited, and may be 100 mass %.

The coating agent of the present embodiment can be prepared by mixing a water-soluble polymer, an inorganic layered mineral, and an aqueous polyurethane resin as necessary, other components as necessary, and an aqueous medium and the like as necessary. The order in which the components are mixed is not specifically limited.

Advantageous Effects

In the gas barrier film 110 described above, when h represents the average height (μm) of the protrusions 101a2 having a height of 0.3 μm or more, the thickness (μm) t of the gas barrier layer 105 satisfies 0.25×h+0.15≤t≤0.8×h; thus, the gas barrier film 110 has high gas barrier properties and high blocking resistance, and the drying load and material cost during formation of the gas barrier layer 105 are minimized.

That is, the thickness t of the gas barrier layer 105 is minimized to such an extent that the gas barrier layer 105 stably exhibits high oxygen barrier properties; thus, formation of the gas barrier layer 105 does not require an excessive amount of coating agent or drying energy. Furthermore, due to the sufficiently small thickness t of the gas barrier layer 105, the surface of the gas barrier layer 105 has the protrusions corresponding to the protrusions 101a2, and the protrusions on the surface of the gas barrier layer 105 prevent the occurrence of blocking. The prevention of the occurrence of blocking allows good processability for post-processing such as coating, rewinding, slitting, printing, and lamination.

The configurations and combinations thereof, and the like of the present embodiment are examples, and additions, omissions, substitutions, and other changes in configuration are possible without departing from the spirit of the present invention.

The gas barrier film may also include, as necessary, a printing layer, an anchor coat layer, an overcoat layer, a light shielding layer, an adhesive layer, a heat seal layer that can be heat-sealed, other functional layers, and the like.

When the gas barrier film includes a heat seal layer that can be heat-sealed, the heat seal layer is preferably located on at least one outermost surface of the gas barrier film. In the case where the gas barrier film includes the heat seal layer, the gas barrier film can be hermetically sealed by heat sealing.

The heat seal layer can be laminated, for example, on a laminate in which the gas barrier layer 105 is provided on at least the first surface 101a of the substrate film 101, by using a known adhesive such as a polyurethane adhesive, a polyester adhesive, or a polyether adhesive by a known method such as dry lamination or extrusion lamination.

EXAMPLES

The present invention will be further described in detail with examples and comparative examples. However, the present invention is not limited to the examples described below.

Materials used in these examples are as follows.
<Materials Used>

Substrate 1: Biaxially stretched polypropylene film containing an anti-blocking agent (trade name: VPH2011, thickness 20 μm, manufactured by A. J. Plast Public Company Limited, having a corona-treated surface)

Substrate 2: Biaxially stretched polypropylene film containing an anti-blocking agent (trade name: TIMCP, thickness 19 μm, manufactured by Max Speciality Films Limited, having a corona-treated surface)

Substrate 3: Biaxially stretched polyethylene terephthalate film containing an anti-blocking agent (trade name: P60, thickness 12 μm, manufactured by Toray Industries, Inc., having a corona-treated surface)

Substrate 4: Biaxially stretched polypropylene film containing no anti-blocking agent, prepared by the following procedure (thickness 20 μm)

As a propylene homopolymer, FS2011DG3 manufactured by Sumitomo Chemical Co., Ltd. was used. The material was melt-extruded by using a screw extruder to form a film having a structure including a single surface layer, a single base layer, and a single back layer. Then, the film was stretched by 5 times in the longitudinal direction (MD) and by 10 times in the lateral direction (TD) by using a tenter. Thus, a simultaneously biaxially stretched polypropylene film having a thickness of 20 μm was obtained. One surface (coated surface) of the obtained film was subjected to corona treatment to form the substrate 4.

Substrate 5: Biaxially stretched polypropylene film containing an anti-blocking agent, prepared by the following procedure (thickness 20 μm).

As a propylene homopolymer, FS2011DG3 manufactured by Sumitomo Chemical Co., Ltd. was used. The material was melt-extruded by using a screw extruder to form a film having a structure that included a single surface layer, a single base layer, and a single back layer and in which MA1002 manufactured by Nippon Shokubai Co., Ltd. was added as an anti-blocking agent to the surface layer and the back layer at a ratio of 3000 ppm to resin (100 mass %). Then, the film was stretched by 5 times in the longitudinal direction (MD) and by 10 times in the lateral direction (TD) by using a tenter. Thus, a simultaneously biaxially stretched polypropylene film having a thickness of 20 μm was obtained. One surface (coated surface) of the obtained film was subjected to corona treatment to form the substrate 5.

Aqueous polyurethane resin aqueous dispersion (A): Aqueous dispersion of an aqueous polyurethane resin containing an acid group-containing polyurethane resin and a polyamine compound (trade name: Takelac (registered trademark) WPB-341, manufactured by Mitsui Chemicals, Inc.)

Water-soluble polymer (B): Polyvinyl alcohol having a saponification degree of 98 to 99% and a polymerization degree of 1000 (trade name: Poval PVA-110, manufactured by Kuraray Co., Ltd.)

Inorganic layered mineral (C): Water-swellable synthetic mica (trade name: NTS-5, manufactured by Topy Industries, Ltd.)

Examples 1 to 3, Comparative Examples 1 and 2

The aqueous polyurethane resin aqueous dispersion (A), the water-soluble polymer (B), and the inorganic layered mineral (C) were blended at a solid content ratio (A):(B):(C) of 20:70:10, and heated and mixed at 80° C. Then, the mixture was cooled to room temperature (30° C.), and diluted with ion-exchanged water and isopropanol so that isopropanol was 10 mass % of the entire aqueous medium solvent and the final solid content concentration was 9 mass %. Thus, a coating agent was prepared.

The obtained coating agent was applied to the corona-treated surface of the substrates shown in Table 1 by a gravure coating method so that the dry thickness was 0.5 μm, and then the substrate was passed through an oven at 90° C. for 10 seconds to be dried to form a gas barrier layer. Thus, gas barrier films of Examples 1 to 3 and Comparative Examples 1 and 2 were obtained.

Example 4

A gas barrier film of Example 4 was obtained in the same manner as in Example 1 except that the coating agent was applied so that the dry thickness was 0.8 μm.

<Evaluation>

The gas barrier films of the respective examples were evaluated as follows. Table 1 shows the results.

FIG. 2 shows a contour map of the height of protruding portions on a surface of the gas barrier layer of the gas barrier film of Example 1 obtained by measurement of the number of protruding portions.

(Measurement of the number of protruding portions and diameter of cross section at height of 0.2 μm)

In a randomly selected region on the surface of the gas barrier layer, the height at the apex of protruding portions from a flat portion was measured under the following conditions by using a 3D measurement laser microscope (LEXT OLS4000, manufactured by Olympus Corporation). A protruding portion whose height was the height of the flat portion+0.2 μm or more was determined as a protrusion. Then, the number of protrusions having a height of twice or more the thickness d of the gas barrier layer (hereinafter also referred to as "protrusions having a height (d×2) or more") and the number of protrusions having a height less than twice the thickness d of the gas barrier layer (hereinafter also referred to as "protrusions having a height less than the height (d×2)") were counted, and each of the counted numbers was converted into a value per unit area. The thickness d of the gas barrier layer was measured by observing a cross section in the thickness direction of the gas barrier film by using a scanning electron microscope (SEM). For all the protruding portions determined as the protrusions, the width of the protrusions having a height of 0.2 μm from the flat portion was measured in a profile mode, and the width was determined as the diameter of a cross section at a height of 0.2 μm of the protrusions. The average of the measured diameters of all the protrusions having a height (d×2) or more was determined as the diameter of the protrusions having a height (d×2) or more. The average of the measured diameters of all the protrusions having a height less than the height (d×2) was determined as the diameter of the protrusions having a height less than the height (d×2).

Lens: Objective lens, magnification 50 times (MPLAPONLEXT50)
Measurement area: 514 μm×1285 μm
Filter: Surface correction
Mode: Measurement in profile mode of height at apex of protruding portions from flat portion and width of protrusions having height of 0.2 μm from flat portion (Measurement of Surface Roughness)

As an index of three-dimensional surface roughness of the surface of the gas barrier layer, an arithmetic mean height Sa (nm) as defined by ISO 25178: Surface texture was measured under the following conditions by using a three-dimensional non-contact surface shape measurement system (Vertscan R3300h Lite, manufactured by Ryoka Systems Inc.).

Measurement region: 1408.31 μm×1885.82 μm
Measurement mode: Phase
Bandpass filter: 520 nm
Center surface correction: 4th
Number of measurement: 3 times
Measurement environment: Temperature 23° C., humidity 47% RH (Measurement of Oxygen Permeability)

For the gas barrier films, oxygen permeability ($cm^3/(m^2 \cdot day \cdot MPa)$) was measured under an atmosphere of 30° C. and relative humidity of 60% by using an oxygen permeability measuring device (OXTRAN-2/20 manufactured by MOCON, Inc.).

(Evaluation of Blocking Resistance)

The gas barrier films were cut into pieces having a size of 50×50 mm, and 6 pieces were stacked and stored under the conditions of a load of 200 kg and 50° C. for 48 hours by using a permanent strain tester (CO-201, manufactured by Tester Sangyo Co., Ltd.). Then, when no blocking occurred, the blocking resistance was evaluated as "Good", and when blocking occurred due to adhesion of the films to each other, the blocking resistance was evaluated as "Poor".

TABLE 1

|  |  | Example 1 | Example 2 | Example 3 | Example 4 | Comparative Example 1 | Comparative Example 2 |
|---|---|---|---|---|---|---|---|
| Substrate type |  | 1 | 3 | 2 | 1 | 4 | 5 |
| Protrusions having height (d × 2) or more | Number [protrusions/mm$^2$] | 92 | 3 | 30 | 32 | 0 | 213 |
|  | Diameter [μm] of cross section at height of 0.2 μm | 8.2 | 7.8 | 6.4 | 7.5 | — | 10.2 |

TABLE 1-continued

|  |  | Example 1 | Example 2 | Example 3 | Example 4 | Comparative Example 1 | Comparative Example 2 |
|---|---|---|---|---|---|---|---|
| Protrusions having height less than height (d × 2) | Number [protrusions/mm$^2$] | 77 | 187 | 100 | 136 | 3 | 60 |
|  | Diameter [μm] of cross section at height of 0.2 μm | 3.1 | 2.9 | 4.1 | 2.2 | 1.0 | 1.4 |
| Oxygen permeability [cm$^3$/(m$^2$ · day · MPa)] |  | 28 | 8 | 13 | 11 | 14 | 86 |
| Blocking resistance |  | Good | Good | Good | Good | Poor | Good |
| Surface roughness (arithmetic mean height Sa) [nm] |  | 45 | 48 | 60 | 40 | 40 | 52 |

The gas barrier films of Examples 1 to 4 had an oxygen permeability of 8 to 28 cm$^3$/(m$^2$·day·MPa) under an atmosphere of 30° C. and relative humidity of 60%, showing good gas barrier properties. Furthermore, the gas barrier films of Examples 1 to 4 had good blocking resistance.

On the other hand, in the gas barrier films of Comparative Examples 1 and 2, the arithmetic mean height Sa of the surface of the gas barrier layer was equivalent to that of the gas barrier films of Examples 1 to 4. However, the gas barrier film of Comparative Example 1, in which the number of protrusions having a height less than the height (d×2) was less than 20 per mm$^2$, had poor blocking resistance. The gas barrier film of Comparative Example 2, in which the number of protrusions having a height (d×2) or more was more than 200 per mm$^2$, had poor gas barrier properties.

Next, examples and comparative examples of a second study will be described.

<Substrate Film>

Substrate 6: Biaxially stretched polypropylene film containing an anti-blocking agent (trade name: VPH2011, thickness 20 μm, manufactured by A. J. Plast Public Company Limited, having a corona-treated surface)

Substrate 7: Biaxially stretched polypropylene film containing an anti-blocking agent (trade name: VPH2011GL2, thickness 20 μm, manufactured by A. J. Plast Public Company Limited, having a corona-treated surface)

Substrate 8: Biaxially stretched polypropylene film containing an anti-blocking agent (trade name: TIMCP, thickness 19 μm, manufactured by Max Speciality Films Limited, having a corona-treated surface)

Substrate 9: Biaxially stretched polypropylene film containing an anti-blocking agent (trade name: 4825A36T, thickness 20 μm, manufactured by Nan Ya Plastics Corporation, having a corona-treated surface)

Substrate 10: Biaxially stretched polyethylene terephthalate film containing an anti-blocking agent (trade name: P60, thickness 12 μm, manufactured by Toray Industries, Inc., having a corona-treated surface)

On the corona-treated surface of the substrate films (substrates 6 to 10), the height of protrusions having a height of 0.3 μm or more and the number thereof and surface roughness were measured in a manner described later. Tables 2 to 6 show the average height h of the protrusions having a height of 0.3 μm or more and the number thereof and the arithmetic mean height Sa of the corona-treated surface of the substrate films.

(Measurement of Average Height h of Protrusions Having Height of 0.3 μm or More and the Number Thereof)

In a randomly selected region of 0.66 mm$^2$ or more on the corona-treated surface of the substrate films, the height at the apex of protruding portions from a flat portion was measured under the following conditions by using a 3D measurement laser microscope (LEXT OLS4000, manufactured by Olympus Corporation). A protruding portion whose height was the height of the flat portion+0.3 μm or more was determined as a protrusion, and the average of the heights (average height h) of the protrusions in the measurement region (0.66 mm$^2$) was calculated. Furthermore, the number of protrusions having a height of 0.3 μm or more was counted, and the counted number was converted into the number of protrusions per 1 mm$^2$.

Lens: Objective lens, magnification 50 times (MPLAPONLEXT50)
Measurement area: 514 μm×1285 μm
Filter: Surface correction
Mode: Measurement in profile mode of height at apex of protruding portions from flat portion FIG. 6 shows a contour map obtained by measurement of the height of the protruding portions on the corona-treated surface of the substrate 6.

(Measurement of Surface Roughness)

As an index of three-dimensional surface roughness of the corona-treated surface of the substrate films, the arithmetic mean height Sa (nm) as defined by ISO 25178: Surface texture was measured under the following conditions by using a three-dimensional non-contact surface shape measurement system (Vertscan R3300h Lite, manufactured by Ryoka Systems Inc.).

Measurement region: 1408.31 μm×1885.82 μm
Measurement mode: Phase
Bandpass filter: 520 nm
Center surface correction: 4th
Number of measurement: 3 times
Measurement environment: Temperature 23° C., humidity 47% RH (Coating Agent)

The same coating agent as in Examples 1 to 4 was used.

Example 1-1

The coating agent was applied to the corona-treated surface of the substrate 6 described above by a gravure coating method so that the dry thickness was approximately 0.3 μm, and then the substrate was passed through an oven at 90° C. for 10 seconds to be dried to form a gas barrier layer. Thus, a gas barrier film of Example 1-1 was obtained.

The obtained gas barrier film was embedded in an embedding resin, and a cross section of the gas barrier film was exposed by using a microtome. Then, the cross section of the gas barrier film was observed by using a scanning electron microscope (SEM). In the obtained SEM image, the thickness of the gas barrier layer at the flat portion was measured at 10 points, and the average of the thicknesses was calculated. Table 2 shows the average thickness as the thickness t of the gas barrier layer.

"Measurement of Oxygen Permeability"

For the obtained gas barrier film, oxygen permeability ($cm^3/(m^2 \cdot day \cdot MPa)$) was measured under an atmosphere of 30° C. and relative humidity of 60% by using an oxygen permeability measuring device (OXTRAN-2/20 manufactured by MOCON, Inc.). Table 2 shows the results.

"Evaluation of Blocking Resistance"

The obtained gas barrier film was cut into pieces having a size of 50×50 mm, and 6 pieces were stacked and stored under the conditions of a load of 200 kg and 50° C. for 48 hours by using a permanent strain tester (CO-201, manufactured by Tester Sangyo Co., Ltd.). Then, when no blocking occurred, the blocking resistance was evaluated as "Good", and when blocking occurred due to adhesion of the films to each other, the blocking resistance was evaluated as "Poor". Table 2 shows the results.

Example 1-2

A gas barrier film of Example 1-2 was obtained in the same manner as in Example 1-1 except that the application amount of the coating agent was changed so that the dry thickness was approximately 0.5 μm. Then, measurement of the gas barrier layer thickness, measurement of the oxygen permeability, and evaluation of the blocking resistance were performed in the same manner as in Example 1-1. Table 2 shows the results.

Example 1-3

A gas barrier film of Example 1-3 was obtained in the same manner as in Example 1-1 except that the application amount of the coating agent was changed so that the dry thickness was approximately 0.7 μm. Then, measurement of the gas barrier layer thickness, measurement of the oxygen permeability, and evaluation of the blocking resistance were performed in the same manner as in Example 1-1. Table 2 shows the results.

Example 1-4

A gas barrier film of Example 1-4 was obtained in the same manner as in Example 1-1 except that the application amount of the coating agent was changed so that the dry thickness was approximately 1.0 μm. Then, measurement of the gas barrier layer thickness, measurement of the oxygen permeability, and evaluation of the blocking resistance were performed in the same manner as in Example 1-1. Table 2 shows the results.

Example 1-5

A gas barrier film of Example 1-5 was obtained in the same manner as in Example 1-1 except that the application amount of the coating agent was changed so that the dry thickness was approximately 1.5 km. Then, measurement of the gas barrier layer thickness, measurement of the oxygen permeability, and evaluation of the blocking resistance were performed in the same manner as in Example 1-1. Table 2 shows the results.

Examples 2-1 to 2-5

Gas barrier films of Examples 2-1 to 2-5 were obtained in the same manner as in Examples 1-1 to 1-5 except that the substrate 7 was used instead of the substrate 6. For these examples, measurement of the gas barrier layer thickness, measurement of the oxygen permeability, and evaluation of the blocking resistance were performed in the same manner as in Examples 1-1 to 1-5. Table 3 shows the results.

Examples 3-1 to 3-5

Gas barrier films of Examples 3-1 to 3-5 were obtained in the same manner as in Examples 1-1 to 1-5 except that the substrate 8 was used instead of the substrate 6. For these examples, measurement of the gas barrier layer thickness, measurement of the oxygen permeability, and evaluation of the blocking resistance were performed in the same manner as in Examples 1-1 to 1-5. Table 4 shows the results.

Examples 4-1 to 4-5

Gas barrier films of Examples 4-1 to 4-5 were obtained in the same manner as in Examples 1-1 to 1-5 except that the substrate 9 was used instead of the substrate 6. For these examples, measurement of the gas barrier layer thickness, measurement of the oxygen permeability, and evaluation of the blocking resistance were performed in the same manner as in Examples 1-1 to 1-5. Table 5 shows the results.

Examples 5-1 to 5-5

Gas barrier films of Examples 5-1 to 5-5 were obtained in the same manner as in Examples 1-1 to 1-5 except that the substrate 10 was used instead of the substrate 6. For these examples, measurement of the gas barrier layer thickness, measurement of the oxygen permeability, and evaluation of the blocking resistance were performed in the same manner as in Examples 1-1 to 1-5. Table 6 shows the results.

TABLE 2

| | | Example 1-1 | Example 1-2 | Example 1-3 | Example 1-4 | Example 1-5 |
|---|---|---|---|---|---|---|
| Substrate film | | Substrate 6 | Substrate 6 | Substrate 6 | Substrate 6 | Substrate 6 |
| Protrusions having height of 0.3 μm or more | Average height h [μm] | 1.8 | 1.8 | 1.8 | 1.8 | 1.8 |
| | 0.25 × h + 0.15 | 0.6 | 0.6 | 0.6 | 0.6 | 0.6 |
| | 0.8 × h | 1.44 | 1.44 | 1.44 | 1.44 | 1.44 |
| | Number [protrusions/$mm^2$] | 108 | 108 | 108 | 108 | 108 |

TABLE 2-continued

|  |  | Example 1-1 | Example 1-2 | Example 1-3 | Example 1-4 | Example 1-5 |
|---|---|---|---|---|---|---|
| Arithmetic mean height Sa [nm] | | 83 | 83 | 83 | 83 | 83 |
| Gas barrier layer thickness t [µm] | | 0.31 | 0.49 | 0.70 | 1.00 | 1.48 |
| Protrusions having height 5t µm or more | Number [protrusions/mm$^2$] | 48 | 21 | 7 | 1 | 0 |
| | Ratio [%] | 44 | 19 | 6 | 1 | 0 |
| Oxygen permeability [cm$^3$/(m$^2$ · day · MPa)] | | 60 | 40 | 12 | 8 | 5 |
| Blocking resistance | | Good | Good | Good | Good | Poor |

TABLE 3

|  |  | Example 2-1 | Example 2-2 | Example 2-3 | Example 2-4 | Example 2-5 |
|---|---|---|---|---|---|---|
| Substrate film | | Substrate 7 | Substrate 7 | Substrate 7 | Substrate 7 | Substrate 7 |
| Protrusions having height of 0.3 µm or more | Average height h [µm] | 1.0 | 1.0 | 1.0 | 1.0 | 1.0 |
| | 0.25 × h + 0.15 | 0.4 | 0.4 | 0.4 | 0.4 | 0.4 |
| | 0.8 × h | 0.8 | 0.8 | 0.8 | 0.8 | 0.8 |
| | Number [protrusions/mm$^2$] | 130 | 130 | 130 | 130 | 130 |
| Arithmetic mean height Sa [nm] | | 70 | 70 | 70 | 70 | 70 |
| Gas barrier layer thickness t [µm] | | 0.30 | 0.49 | 0.69 | 1.02 | 1.45 |
| Protrusions having height 5t µm or more | Number [protrusions/mm$^2$] | 24 | 2 | 0 | 0 | 0 |
| | Ratio [%] | 18 | 2 | 0 | 0 | 0 |
| Oxygen permeability [cm$^3$/(m$^2$ · day · MPa)] | | 35 | 15 | 10 | 7 | 5 |
| Blocking resistance | | Good | Good | Good | Poor | Poor |

TABLE 4

|  |  | Example 3-1 | Example 3-2 | Example 3-3 | Example 3-4 | Example 3-5 |
|---|---|---|---|---|---|---|
| Substrate film | | Substrate 8 | Substrate 8 | Substrate 8 | Substrate 8 | Substrate 8 |
| Protrusions having height of 0.3 µm or more | Average height h [µm] | 0.8 | 0.8 | 0.8 | 0.8 | 0.8 |
| | 0.25 × h + 0.15 | 0.35 | 0.35 | 0.35 | 0.35 | 0.35 |
| | 0.8 × h | 0.64 | 0.64 | 0.64 | 0.64 | 0.64 |
| | Number [protrusions/mm$^2$] | 124 | 124 | 124 | 124 | 124 |
| Arithmetic mean height Sa [nm] | | 63 | 63 | 63 | 63 | 63 |
| Gas barrier layer thickness t [µm] | | 0.30 | 0.50 | 0.71 | 1.00 | 1.49 |
| Protrusions having height 5t µm or more | Number [protrusions/mm$^2$] | 15 | 1 | 0 | 0 | 0 |
| | Ratio [%] | 12 | 1 | 0 | 0 | 0 |
| Oxygen permeability [cm$^3$/(m$^2$ · day · MPa)] | | 35 | 13 | 9 | 7 | 5 |
| Blocking resistance | | Good | Good | Poor | Poor | Poor |

TABLE 5

|  |  | Example 4-1 | Example 4-2 | Example 4-3 | Example 4-4 | Example 4-5 |
|---|---|---|---|---|---|---|
| Substrate film | | Substrate 9 | Substrate 9 | Substrate 9 | Substrate 9 | Substrate 9 |
| Protrusions having height of 0.3 µm or more | Average height h [µm] | 0.7 | 0.7 | 0.7 | 0.7 | 0.7 |
| | 0.25 × h + 0.15 | 0.325 | 0.325 | 0.325 | 0.325 | 0.325 |
| | 0.8 × h | 0.56 | 0.56 | 0.56 | 0.56 | 0.56 |
| | Number [protrusions/mm$^2$] | 156 | 156 | 156 | 156 | 156 |

TABLE 5-continued

|  | Example 4-1 | Example 4-2 | Example 4-3 | Example 4-4 | Example 4-5 |
|---|---|---|---|---|---|
| Arithmetic mean height Sa [nm] | 44 | 44 | 44 | 44 | 44 |
| Gas barrier layer thickness t [μm] | 0.31 | 0.50 | 0.72 | 0.99 | 1.48 |
| Protrusions having height 5t μm or more — Number [protrusions/mm$^2$] | 2 | 0 | 0 | 0 | 0 |
| Protrusions having height 5t μm or more — Ratio [%] | 1 | 0 | 0 | 0 | 0 |
| Oxygen permeability [cm$^3$/(m$^2$ · day · MPa)] | 30 | 12 | 9 | 7 | 5 |
| Blocking resistance | Good | Good | Poor | Poor | Poor |

TABLE 6

|  | Example 5-1 | Example 5-2 | Example 5-3 | Example 5-4 | Example 5-5 |
|---|---|---|---|---|---|
| Substrate film | Substrate 10 | Substrate 10 | Substrate 10 | Substrate 10 | Substrate 10 |
| Protrusions having height of 0.3 μm or more — Average height h [μm] | 0.7 | 0.7 | 0.7 | 0.7 | 0.7 |
| Protrusions having height of 0.3 μm or more — 0.25 × h + 0.15 | 0.325 | 0.325 | 0.325 | 0.325 | 0.325 |
| Protrusions having height of 0.3 μm or more — 0.8 × h | 0.56 | 0.56 | 0.56 | 0.56 | 0.56 |
| Protrusions having height of 0.3 μm or more — Number [protrusions/mm$^2$] | 92 | 92 | 92 | 92 | 92 |
| Arithmetic mean height Sa [nm] | 48 | 48 | 48 | 48 | 48 |
| Gas barrier layer thickness t [μm] | 0.33 | 0.51 | 0.73 | 1.03 | 1.53 |
| Protrusions having height 5t μm or more — Number [protrusions/mm$^2$] | 0 | 0 | 0 | 0 | 0 |
| Protrusions having height 5t μm or more — Ratio [%] | 0 | 0 | 0 | 0 | 0 |
| Oxygen permeability [cm$^3$/(m$^2$ · day · MPa)] | 13 | 8 | 5 | 3 | 10 |
| Blocking resistance | Good | Good | Poor | Poor | Poor |

Among Examples 1-1 to 1-5, 2-1 to 2-5, 3-1 to 3-5, 4-1 to 4-5, and 5-1 to 5-5, Examples 1-3 and 1-4, 2-2 and 2-3, 3-2, 4-2, and 5-1 and 5-2 are the examples, and the other Examples are the comparative examples.

In Tables 2 to 6, the ratio of the protrusions having a height 5t μm or more is a ratio to the total number of protrusions having a height of 0.3 μm or more.

The gas barrier films of the examples in which the thickness t of the gas barrier layer satisfied $0.25 \times h + 0.15 \leq t \leq 0.8 \times h$ had an oxygen permeability of 20 cm$^3$/(m$^2$·day·MPa) or less under an atmosphere of 30° C. and relative humidity of 60%, showing high gas barrier properties. Furthermore, the gas barrier films of the examples had good blocking resistance.

On the other hand, the gas barrier films of the comparative examples in which the thickness t of the gas barrier layer was less than (0.25×h+0.15) had an oxygen permeability of 30 cm$^3$/(m$^2$·day·MPa) or more under an atmosphere of 30° C. and relative humidity of 60%, showing poor gas barrier properties. In the gas barrier films of the comparative examples in which the thickness t of the gas barrier layer was more than (0.8×h), the occurrence of blocking was observed in the evaluation of the blocking resistance, showing poor processability in post-processes.

INDUSTRIAL APPLICABILITY

The gas barrier film of the present invention stably exhibits high gas barrier properties even in a high humidity atmosphere, and has adhesion strength and film cohesive strength sufficient as a packaging material. Furthermore, the thinner oxygen barrier film can achieve lower raw material cost.

The gas barrier film of the present invention can be suitably used, for example, as a packaging material. Use of the gas barrier film of the present invention as a packaging material can enhance quality retention of the contents.

In the gas barrier film of the present invention, the occurrence of blocking is prevented, leading to good processability of the gas barrier film.

The gas barrier film of the present invention provided with a gas barrier layer having a thickness appropriate for a substrate film to be used can optimize the material cost and production energy. The gas barrier film of the present invention can be suitably used, for example, as an inexpensive packaging material, and can enhance quality retention of the contents.

[Reference Signs List] 1 . . . Substrate film; 3 . . . Anti-blocking agent; 5 . . . Gas barrier layer; 5a . . . Flat portion; 5b, 5c . . . Protrusion; 10 . . . Gas barrier film; 101 . . . Substrate film; 101a . . . First surface; 101a1 . . . Flat portion; 101a2 . . . Protrusion; 101b . . . Second surface; 103 . . . Anti-blocking agent; 105 . . . Gas barrier layer; 105a . . . Flat portion; 110, 110A . . . Gas barrier film.

What is claimed is:

1. A gas barrier film, comprising:
   a substrate film containing a resin; and
   a gas barrier layer that has oxygen barrier properties and is located in contact with at least one surface of the substrate film, wherein:
   a surface of the gas barrier layer has
   a flat portion, and
   a plurality of protrusions that protrude from the flat portion; and
   the number of protrusions that satisfy the following formula (1) is 0 to 100 per mm$^2$, and the number of protrusions that satisfy the following formula (2) is 20 to 200 per mm²:

$$d \times 2 \leq f \quad (1);\text{ and}$$

$$0.2 \leq f < d \times 2 \quad (2),$$

where d represents a thickness (μm) of the gas barrier layer, and f represents a height (μm) of each of the plurality of protrusions.

2. The gas barrier film of claim 1, wherein the protrusions that satisfy the formula (2) have a diameter of 0.4 to 10 μm in a cross section at a height of 0.2 μm.

3. The gas barrier film of claim 1, wherein:
the substrate film further contains an anti-blocking agent; and
the protrusions are derived from the anti-blocking agent.

4. The gas barrier film of claim 1, wherein the gas barrier layer is a film made of a coating agent containing a water-soluble polymer and an inorganic layered mineral.

5. The gas barrier film of claim 4, wherein the coating agent further contains an aqueous polyurethane resin containing a polyurethane resin having an acid group and a polyamine compound.

6. The gas barrier film of claim 1, wherein the substrate film is a polyolefin resin film, a polyester resin film, or a polyamide resin film.

7. The gas barrier film of claim 1, wherein the thickness of the gas barrier layer is 0.3 to 1 μm.

8. The gas barrier film of claim 1, wherein the number of protrusions that satisfy the formula (1) is 3 to 92 per mm²;
the number of protrusions that satisfy the following formula (2) is 77 to 187 per mm²; and
the thickness of the gas barrier layer is 0.5 to 0.8 μm.

9. A gas barrier film, comprising:
a substrate film containing a resin; and
a gas barrier layer which is an oxygen barrier film formed by a wet coating method and is located in contact with at least one surface of the substrate film, wherein:
the surface of the substrate film that is in contact with the gas barrier layer has a flat portion and a plurality of protrusions that protrude from the flat portion; and
in a randomly selected region of 0.66 mm² or more on the surface of the substrate film in contact with the gas barrier layer, measuring a height of each of the plurality of protrusions by using a 3D measurement laser microscope, a thickness t(μm) of the gas barrier layer satisfies the following formula (3):

$$0.25 \times h + 0.15 \leq t \leq 0.8 \times h \quad (3),$$

where h represents an average height (μm) of protrusions having a height of 0.3 μm to 1.5 μm.

10. The gas barrier film of claim 9, wherein on the surface of the substrate film in contact with the gas barrier layer, the number of protrusions having a height of 5 times or more that of a thickness of the gas barrier layer is 10 or less per mm².

11. The gas barrier film of claim 9, wherein:
the substrate film further contains an anti-blocking agent; and
the protrusions are derived from the anti-blocking agent.

12. The gas barrier film of claim 9, wherein the gas barrier layer is a film made of a coating agent containing a water-soluble polymer and an inorganic layered mineral.

13. The gas barrier film of claim 12, wherein the coating agent further contains an aqueous polyurethane resin containing a polyurethane resin having an acid group, and a polyamine compound.

14. The gas barrier film of claim 9, wherein the substrate film is a polyolefin resin film, a polyester resin film, or a polyamide resin film.

15. The gas barrier layer of claim 9, wherein the thickness of the gas barrier is 0.4 to 1.0 μm.

16. The gas barrier layer of claim 11, wherein the thickness of the gas barrier is 0.4 to 1.0 μm.

* * * * *